US007593789B2

(12) United States Patent
Gougerot et al.

(10) Patent No.: US 7,593,789 B2
(45) Date of Patent: *Sep. 22, 2009

(54) WATER FLOW DETECTION SYSTEM FOR A BATHING UNIT

(75) Inventors: Florent Gougerot, Quebec (CA); Daniel Gaudreau, St-Jean Chrysostome (CA); Benoit Laflamme, Quebec (CA); Christian Brochu, Quebec (CA); Jean Bizouard, Quebec (CA)

(73) Assignee: Gecko Alliance Group Inc., Quebec, Quebec (CA)

( * ) Notice: Subject to any disclaimer, the term of this patent is extended or adjusted under 35 U.S.C. 154(b) by 448 days.

This patent is subject to a terminal disclaimer.

(21) Appl. No.: 11/389,185

(22) Filed: Mar. 27, 2006

(65) Prior Publication Data

US 2006/0162719 A1    Jul. 27, 2006

Related U.S. Application Data

(63) Continuation-in-part of application No. 10/998,537, filed on Nov. 30, 2004, now Pat. No. 7,440,820.

(51) Int. Cl.
*G06F 19/00* (2006.01)
(52) U.S. Cl. .................. 700/275; 700/299; 392/471; 219/497; 219/501; 219/506; 219/481; 219/483; 219/412; 374/102; 374/103; 374/107
(58) Field of Classification Search ............. 700/275; 392/471; 219/497, 506, 501, 481, 483, 412; 374/102–103, 107
See application file for complete search history.

(56) References Cited

U.S. PATENT DOCUMENTS 4,638,147 A    1/1987  Dytch et al.
5,079,784 A    1/1992  Rist et al.
5,361,215 A    11/1994 Tompkins et al.
5,526,538 A *  6/1996  Rainwater ................. 4/541.1
5,550,753 A    8/1996  Tompkins et al.
5,559,720 A    9/1996  Tompkins et al.
D388,161 S     12/1997 Thweatt
5,724,478 A    3/1998  Thweatt
D398,042 S     9/1998  Thweatt
5,872,890 A    2/1999  LaCombe
5,932,127 A    8/1999  Maddox
D415,264 S     10/1999 Thweatt, Jr.

(Continued)

FOREIGN PATENT DOCUMENTS

EP    0 317 435 B1    6/1992

(Continued)

*Primary Examiner*—Michael D Masinick

(57) ABSTRACT

The present invention provides a control system for a bathing unit that comprises a heating module, a temperature sensing entity and a heating module controller. The heating module includes a body that defines a passage through which water can flow, that has an inner surface and an outer surface. The heating module further includes a heating device that is operative for heating the water that flows through the body. The temperature sensing entity is mounted to the outer surface of the body such that the temperature sensing entity is in thermally conductive communication with water flowing through the body. The heating module controller is operative for obtaining temperature information associated with the temperature sensing entity for detecting at least in part on the basis of the temperature information the sufficiency of water flow through the body.

40 Claims, 13 Drawing Sheets

U.S. PATENT DOCUMENTS

| | | | |
|---|---|---|---|
| 6,080,973 | A | 6/2000 | Thweatt, Jr. |
| 6,282,370 | B1 | 8/2001 | Cline et al. |
| 6,476,363 | B1 | 11/2002 | Authier et al. |
| 6,555,796 | B1 | 4/2003 | Cusack |
| 6,563,328 | B1 | 5/2003 | Lenormand et al. |
| 6,590,188 | B2 | 7/2003 | Cline et al. |
| 6,621,985 | B1 | 9/2003 | Thweatt, Jr. |
| 6,629,021 | B2 | 9/2003 | Cline et al. |
| 6,643,108 | B2 | 11/2003 | Cline et al. |
| 6,643,454 | B1 | 11/2003 | Rochelle |
| 6,873,793 | B2 | 3/2005 | Thweatt, Jr. |
| 6,976,052 | B2 | 12/2005 | Tompkins et al. |
| 6,976,636 | B2 | 12/2005 | Thweatt, Jr. |
| 2001/0029407 | A1 | 10/2001 | Tompkins et al. |
| 2002/0000007 | A1 | 1/2002 | Pittman |
| 2002/0047006 | A1 | 4/2002 | Cline et al. |
| 2002/0050490 | A1 | 5/2002 | Pittman et al. |
| 2003/0168516 | A1 | 9/2003 | Cline |
| 2004/0197095 | A1 | 10/2004 | Thweatt, Jr. |
| 2005/0129391 | A1 | 6/2005 | Thweatt, Jr. |

FOREIGN PATENT DOCUMENTS

| | | |
|---|---|---|
| EP | 05 29 2224 | 2/2006 |
| WO | WO 96/13963 | 5/1996 |

* cited by examiner

WATER FLOW DETECTION SYSTEM FOR A BATHING UNIT

CROSS-REFERENCES TO RELATED APPLICATIONS

This application is a continuation-in-part application of U.S. patent application Ser. No. 10/998,537 filed Nov. 30, 2004 now U.S. Pat. No. 7,440,820. The contents of the above referenced application are incorporated herein by reference.

FIELD OF THE INVENTION

The present invention relates to a control system for a bathing unit. More specifically, the present invention relates to a control system for a bathing unit that is operative to detect the sufficiency of water flow through a heating module of the bathing unit.

BACKGROUND OF THE INVENTION

Bathing units, such as spas, whirlpools, hot tubs, bathtubs and swimming pools, often include a water holding receptacle, one or more water pumps, a filter system, an air blower, a lighting system, a heating module that includes a heating element, and a control system for activating and managing the various components of the bathing unit.

In use, the water pumps typically circulate the water of the bathing unit through the heating module such that the heating element is able to heat the water flowing through the heating module. The heating element is typically controlled by the control system which selectively activates/deactivates the heating element in order to set the water in the bathing unit at a desired temperature. A consideration associated with the heating of the water is the risk of damage to the heating element, the bathing unit components and the piping system when the heating element becomes too hot. The risk of damage due to overheating is increased in new bathing units since the current trend is to construct heating modules with plastic components. Plastic components are lighter, less costly to manufacture and are subject to less corrosion than their equivalent metallic components. However, plastic materials generally have thermal properties that are inferior to metallic materials. As such, the early detection of situations where the heating element is overheated, or in the process of overheating, is desirable.

More particularly, an overheating situation can sometimes lead to a condition commonly referred to as a dry fire. Dry fires occur when there is no water in the heating module or when the flow of water is too weak to remove enough heat from the heating module. The insufficiency of water flow through the heating module may create some hot spots on the heating element, which can damage and/or decrease the life expectancy of the heating element. Insufficient flow or an insufficient level of water in the heating module can occur as a result, for example, of a blockage in the piping system, a dirty filter system preventing the normal flow of water in the heating module or simply from a low water level in the water holding receptacle.

In order to prevent the occurrence of dry fires, systems have been designed to detect low water level conditions in heating devices such as to prevent the heating element from being activated when the water level is too low. Typically, the presence of water in the heating module is detected by a pressure switch. However, this method does not give any indication as to the level of water flow through the heating module, and as mentioned above, the risk of damage due to overheating is increased if the flow inside the heating module is weak. In addition, such pressure switches have a limited life span due to the fact that they include moving parts that can deteriorate and break. They also need calibration due to the fact that they shift over time.

Another proposed solution for detecting the presence of water flow within the heating module is described in U.S. Pat. No. 6,282,370 issued to Cline et al. on Aug. 28, 2001. The contents of the above document are incorporated herein by reference. In the system described, a solid state water temperature sensor provides signals indicative of the water temperature within the heating module at two different locations. A control system controls a heating element based on the difference in temperature readings of the two temperature sensors. A deficiency with this system is that multiple components are required in order to determine the flow of water.

A similar solution is also described in U.S. Pat. No. 6,590,188 issued to Cline et al. on Jul. 8, 2003. The contents of the above document are incorporated herein by reference.

Based on the above, it would seem that existing systems offer no suitable manner for detecting if there is sufficient flow within the heating module. A system that could detect the presence of a sufficient level of flow within the heating module without the deficiencies described above would be desirable. As such, there is a need in the industry for a control system suitable for a bathing unit that is able to detect the sufficiency of water flow through a heating module and that alleviates at least in part the problems associated with the existing control systems.

Against the background described above, it appears that there is a need in the industry to provide a temperature control system suitable for a bathing unit that alleviates at least in part the problems associated with the existing bathing units.

SUMMARY OF THE INVENTION

In accordance with a first broad aspect, the present invention provides a control system for a bathing unit. The control system comprises a heating module, a temperature sensing entity and a heating module controller. The heating module includes a body that defines a passage through which water can flow. The heating module further includes a heating device that is operative for heating the water that flows through the body. The temperature sensing entity is mounted in thermally conductive communication with water flowing through the body. The heating module controller is operative for obtaining temperature information associated with the temperature sensing entity for detecting at least in part on the basis of the temperature information the sufficiency of water flow through the body.

In accordance with another broad aspect, the invention provides a method for measuring a sufficiency of water flow through a heating system for a bathing unit. The heating system includes a heating module, a temperature sensing entity mounted in thermally conductive communication with water flowing through the heating module and a heating module controller for controlling activation of the heating module. The method comprises obtaining a first temperature measurement associated with the temperature sensing entity and then activating the temperature sensing entity for a predetermined time interval. The method also comprises deactivating the temperature sensing entity following the predetermined time interval. The method also comprises obtaining a subsequent temperature measurement associated with the temperature sensing entity, the subsequent temperature measurement being taken a certain time interval after deactivating the temperature sensing entity. The method also comprises processing the first temperature measurement and the subsequent temperature measurement to derive information associated to a sufficiency of water flow through the heating module. The method also comprises causing the heating module controller to control the activation of the heating module at least in part on the basis of the information associated to the sufficiency of water flow.

In accordance with specific implementations, the temperature sensing entity may be activated and deactivated independently from the activation and deactivation of the heating module or, alternatively, the temperature sensing entity is activated and deactivated concurrently with the activation and deactivation of the heating module.

In a specific implementation, the steps of a) obtaining the first temperature measurement; b) activating and c) deactivating the temperature sensing entity, d) obtaining the subsequent temperature measurement; and e) deriving information associated to a sufficiency of water flow through the heating module are performed while the heating module remains deactivated. Advantageously, this allows avoiding the activation of the heating module when the flow of water through the heating module is insufficient.

In accordance with a specific implementation, the method comprises computing a difference measurement indicative of a difference between the first temperature measurement and the subsequent temperature measurement and deriving the information associated to the sufficiency of water flow through the heating module at least in part on the basis of the difference measurement.

In accordance with a specific implementation, the subsequent temperature measurement is a third temperature measurement. The method comprises obtaining a second temperature measurement associated with the temperature sensing entity, the second temperature measurement being taken after deactivating the temperature sensing entity and prior to taking the third temperature measurement. The method also comprises processing the first temperature measurement, the second temperature measurement and the third temperature measurement to derive information associated to the sufficiency of water flow through the heating module.

In accordance with a specific example of implementation, the method comprises computing a first difference measurement indicative of a difference between the first temperature measurement and the second temperature measurement. The method also comprises computing a second difference measurement indicative of a difference between the first temperature measurement and the third temperature measurement. The method also comprises deriving the information associated to the sufficiency of water flow through the heating module at least in part on the basis of a ratio between the first difference measurement and the second difference measurement.

In accordance with yet another broad aspect, the invention provides a computer readable medium including a program element suitable for execution by a computing apparatus for measuring a sufficiency of water flow through a heating system for a bathing unit in accordance with the above described method.

In accordance with another broad aspect, the invention provides a control system for regulating water temperature a bathing unit, the bathing unit including a receptacle for holding water. The control system comprises a heating module for heating water including a body defining a passage through which water can flow, a temperature sensing entity mounted in thermally conductive communication with water flowing through the body of the heating module and a heating module for controlling activation of the heating module. The heating module controller is operative for performing a water flow sufficiency detection process in accordance with the above-described method.

In accordance with a specific implementation, the body of the heating module has a thermally conductive portion that extends from an inner surface of the body to an outer surface of the body and the temperature sensing entity is mounted in contact with that thermally conductive portion.

In accordance with a specific implementation, the control system includes a user interface for conveying to a user data derived at least in part from the information associated to the sufficiency of water flow through the heating module. The user interface may include for example a display unit or any suitable type of a visual indicator (such as one or more LEDs for example) for indicating a sufficient of water flow in the body of the heating module.

In accordance with a specific implementation, the temperature sensing entity includes a thermal sensor and a thermal element, the thermal sensor being adapted for providing temperature measurements associated with the thermal element. In an alternative embodiment, the temperature sensing entity comprises a unitary thermal component adapted for acquiring a heating state and for providing information associated to a measure of temperature of the temperature sensing entity. In this alternative embodiment, the temperature measurements are derived from the physical properties of the temperature sensing entity. In a practical implementation, the unitary thermal component is in the form of a transistor, the transistor including a base and an emitter. In this implementation, obtaining a temperature measurement associated with the temperature sensing entity is performed by obtaining a voltage measurement between the base and emitter of the transistor and processing the voltage measurement to derive the temperature measurement. Advantageously, by using the physical properties of the temperature sensing entity to derive temperature information, the use of a temperature sensor can be avoided.

In accordance with yet another broad aspect, the invention provides a control system for a bathing unit. The control system comprises a heating module, a temperature sensing entity and a heating module controller. The heating module includes a body defining a passage through which water can flow, the heating module being operative for heating the water that flows through the body. The temperature sensing entity is mounted in thermally conductive communication with water flowing through the body of the heating module. The temperature sensing entity includes a unitary thermal component adapted for acquiring a heating state and for providing information associated to a measure of temperature of the temperature sensing entity. The heating module controller is operative for activating and deactivating the temperature sensing entity to obtaining temperature information associated with the temperature sensing entity. The heating module controller is also adapted for processing the temperature information associated with the temperature sensing entity to derive information associated to a sufficiency of water flow through the body of the heating module. The heating module controller is adapted for controlling activation of the heating module at least in part on the basis of the information associated to the sufficiency of water flow.

In a specific example of implementation, the heating module controller is operative for preventing the heating module from heating the water in the body of the heating module upon detection of an insufficient water flow through the body of the heating module.

In a specific example of implementation, the temperature sensing entity includes a device selected from the set consisting of TRIACs, SRCs, FETs, IGBTs, MOSFETs, JFETs and BJTs (bipolar junction transistors).

In accordance with a specific implementation, the temperature sensing entity includes a transistor, the transistor including a base and an emitter. In this implementation, obtaining a temperature measurement associated with the temperature sensing entity is performed by obtaining a voltage measurement between the base and emitter of the transistor and processing the voltage measurement to derive the first temperature measurement. Advantageously, by using the physical properties of the temperature sensing entity to derive temperature information, the use of a temperature sensor can be avoided.

In accordance with yet another broad aspect, the invention provides a control system for a bathing unit. The control system comprises heating means including a body defining a passage through which water can flow, the heating means being operative for heating the water that flows through the body of the heating means. The control system also comprises a temperature sensing entity mounted in thermally conductive communication with water flowing through the body. The temperature sensing entity includes a unitary thermal component adapted for acquiring a heating state and for providing information associated to a measure of temperature of the temperature sensing entity. The control system also comprises means for activating and deactivating the temperature sensing entity to obtain temperature information associated with the temperature sensing entity. The control system also comprises means for processing the temperature information associated with the temperature sensing entity to derive information associated to a sufficiency of water flow through the body of the heating means. The control system also comprises means for controlling activation of the heating means at least in part on the basis of the information associated to the sufficiency of water flow.

In accordance with a second broad aspect, the present invention provides a method for detecting a sufficiency of water flow through a heating module of a bathing unit. The heating module has a body defining a passage through which water can flow and a heating device for heating the water that flows through the body. The body has an inner surface, an outer surface and a thermally conductive portion extending from the inner surface to the outer surface. The method comprises deriving temperature information associated to a temperature sensing entity mounted to the outer surface of the body such that it is in thermally conductive communication with water flowing through the body, and detecting at least in part on the basis of the temperature information the sufficiency of water flow through the body.

In accordance with another broad aspect, the invention provides a control system for a bathing unit. The control system comprises a heating module that includes a body defining a passage through which water can flow and a heating device operative for heating the water within the body. The control system further comprises a temperature sensor for obtaining temperature information associated to the water that has been heated by said heating device, and a heating module controller for detecting at least in part on a basis of the temperature information the sufficiency of water flow through the body.

In accordance with another broad aspect, the invention provides a method for detecting a sufficiency of water flow through a heating module of a bathing unit. The heating module includes a body that defines a passage through which water can flow and a heating device that heats the water that flows through the body. The method comprises activating a device for causing the heating device to acquire a heating state for a predetermined period of time, deriving temperature information associated with the water that has been heated by the heating device and detecting at least in part on the basis of the temperature information the sufficiency of water flow through the body.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of examples of implementation of the present invention is provided herein below with reference to the following drawings, in which.

Figure 1:
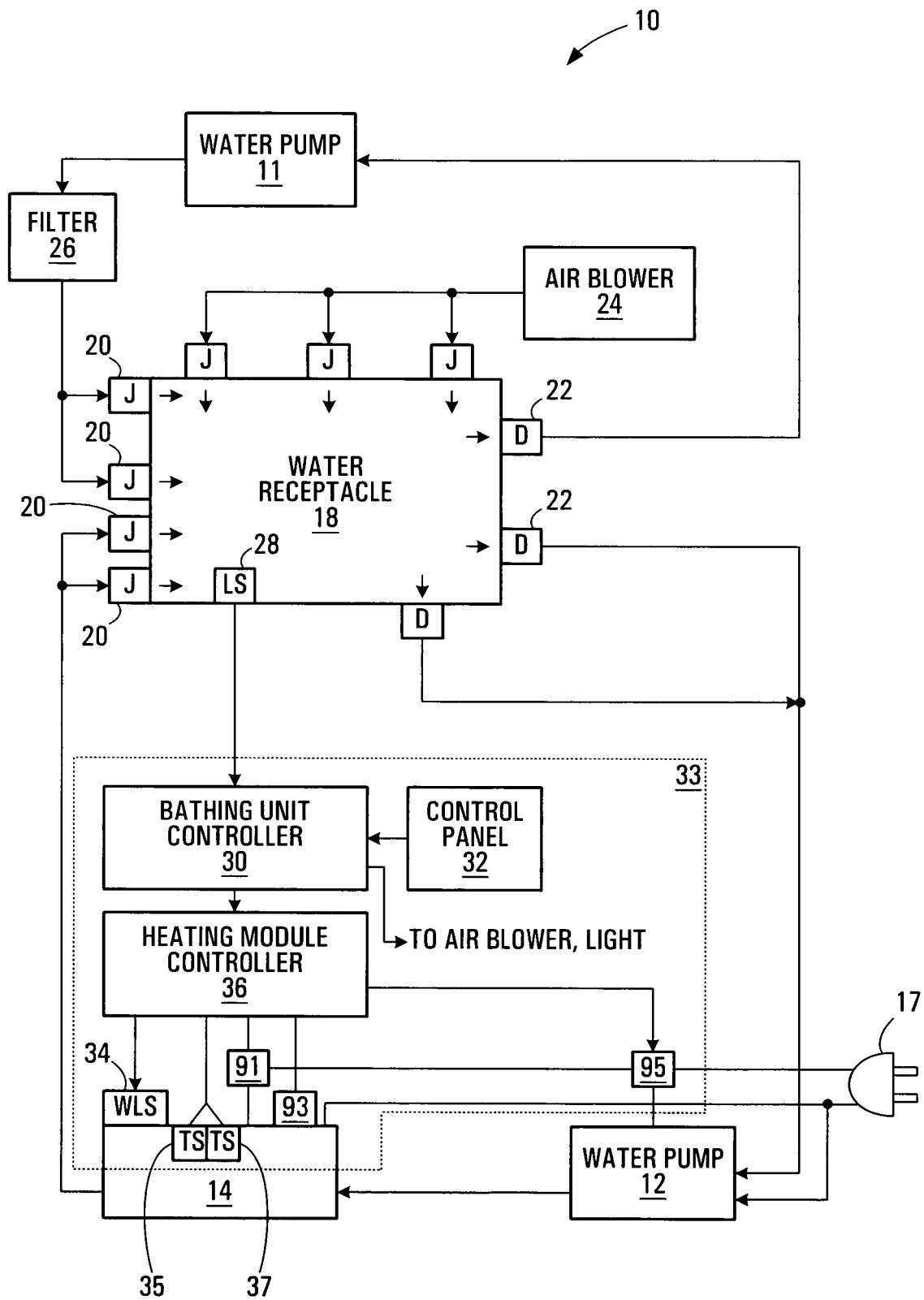
FIG. 1 shows a bathing unit system equipped with a control system in accordance with a non-limiting example of implementation of the present invention.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION

FIG. 1 illustrates a block diagram of a bathing unit system 10 in accordance with a specific example of implementation of the present invention. It is to be understood that the expressions "bathing unit" and "bathing unit system", as used for the purposes of the present description, refer to spas, whirlpools, hot tubs, bath tubs, swimming pools and any other type of bathing receptacle that can be equipped with a control system for controlling various operational settings.

The bathing unit system 10 shown in FIG. 1 includes a water receptacle 18 for holding water, a plurality of jets 20, two water pumps 11 & 12, a set of drains 22, a heating module 14 and a control system 33. In normal operation, water flows from the water receptacle 18, through a drain 22 and is pumped by water pumps 12 through the heating module 14 where the water is heated. The heated water then leaves the heating module 14 and re-enters the water receptacle 18 through jets 20. This cycle of water leaving the water receptacle 18 through drain 22, passing through the heating module 14 and re-entering the water receptacle 18 through the jets 20 is repeated while water pump 12 is activated.

In addition, in normal use, water also passes through a cycle wherein the water flows from the water receptacle 18, through a different drain 22 and is pumped by water pump 11 through a filter 26. After having been filtered, the water then re-enters the water receptacle through different jets 20. This cycle of water leaving the water receptacle 18 through drain 22, passing through the filter 26 and re-entering the water receptacle 18 through the jets 20 can be repeated on a continual basis in order to keep the water in the water receptacle 18 clean from particulate impurities.

Optionally, in a non-limiting embodiment, the bathing unit system 10 can also include an air blower 24 for delivering air bubbles to the water receptacle 18, a light system 28 for illuminating the water and any other device suitable for use in connection with a bathing unit.

The control system 33 is operative for controlling the various components of the bathing unit system 10. In the non-limiting example of implementation shown in FIG. 1, the control system 33 includes a control panel 32, a bathing unit controller 30, a heating module controller 36, water temperature sensors 35, 37, and a plurality of actuators 91, 93, and 95. In the non-limiting embodiment shown in FIG. 1, the control system 33 also includes a water level sensor 34, which is an optional component. As will be described in more detail below, in a non-limiting example of implementation, the water level sensor 34 can be a capacitive water level sensor.

The control panel 32 is typically in the form of a user interface for allowing a user to control various operational settings of the bathing unit. Some non-limiting examples of operational settings of the bathing unit include a temperature control setting, jet control settings and light control settings.

For the purpose of clarity, the bathing unit controller 30 and the heating module controller 36 are shown as separate components that are each able to control operational settings of the components of the bathing unit system 10. It will be appreciated that the functionality of the heating module controller 36 and the bathing unit controller 30 may be partially or fully integrated with one another without detracting from the spirit of the invention. For example, practical implementations of the invention may have either separate physical components for the bathing unit controller 30 and the heating module controller 36, or a same component where the functionality of the heating module controller 36 and bathing unit controller 30 are integrated.

Figure 2A:
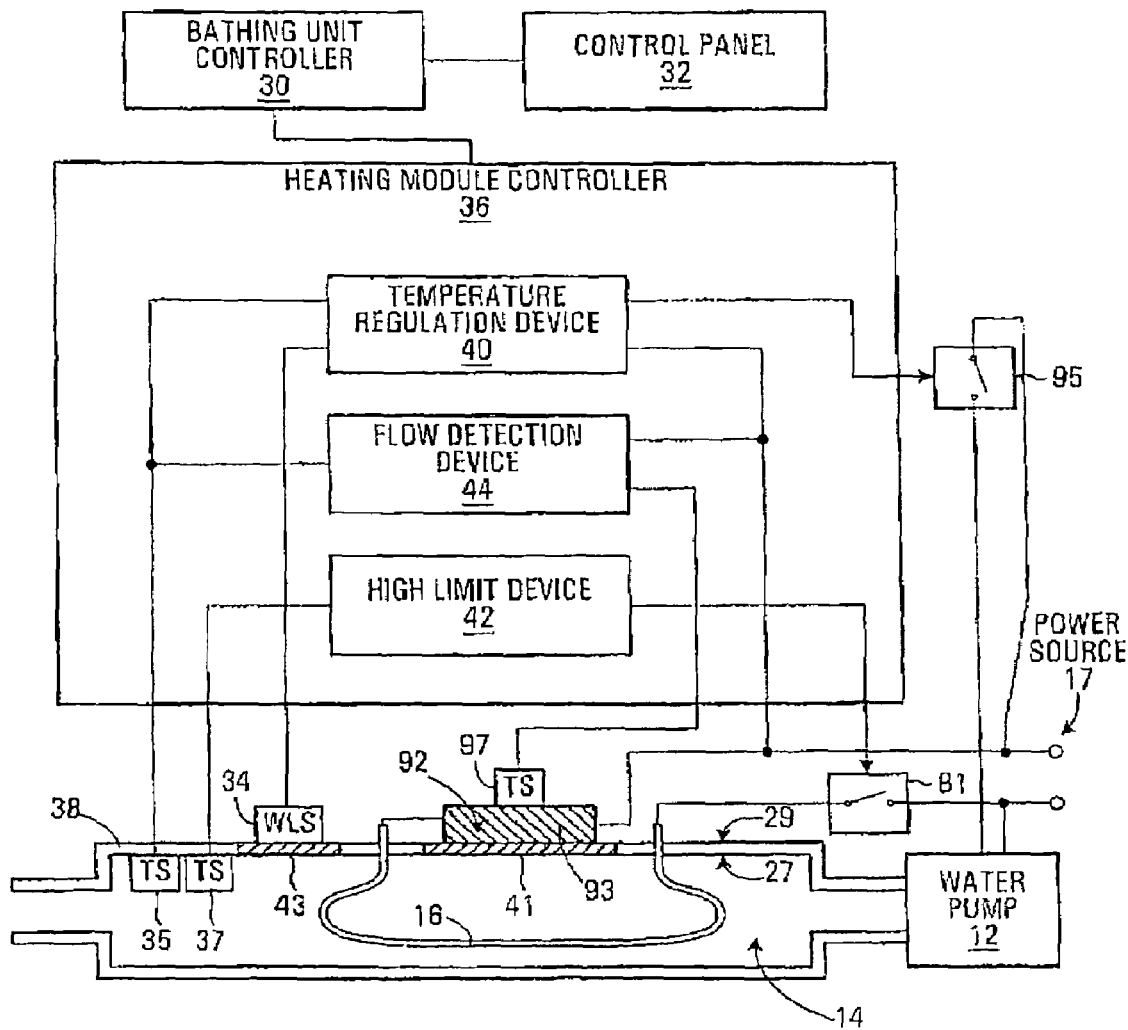
FIG. 2A shows a block diagram of a first non-limiting example of implementation of a control system in communication with a heating module suitable for use with a bathing unit system as shown in FIG. 1.
Figure 2B:
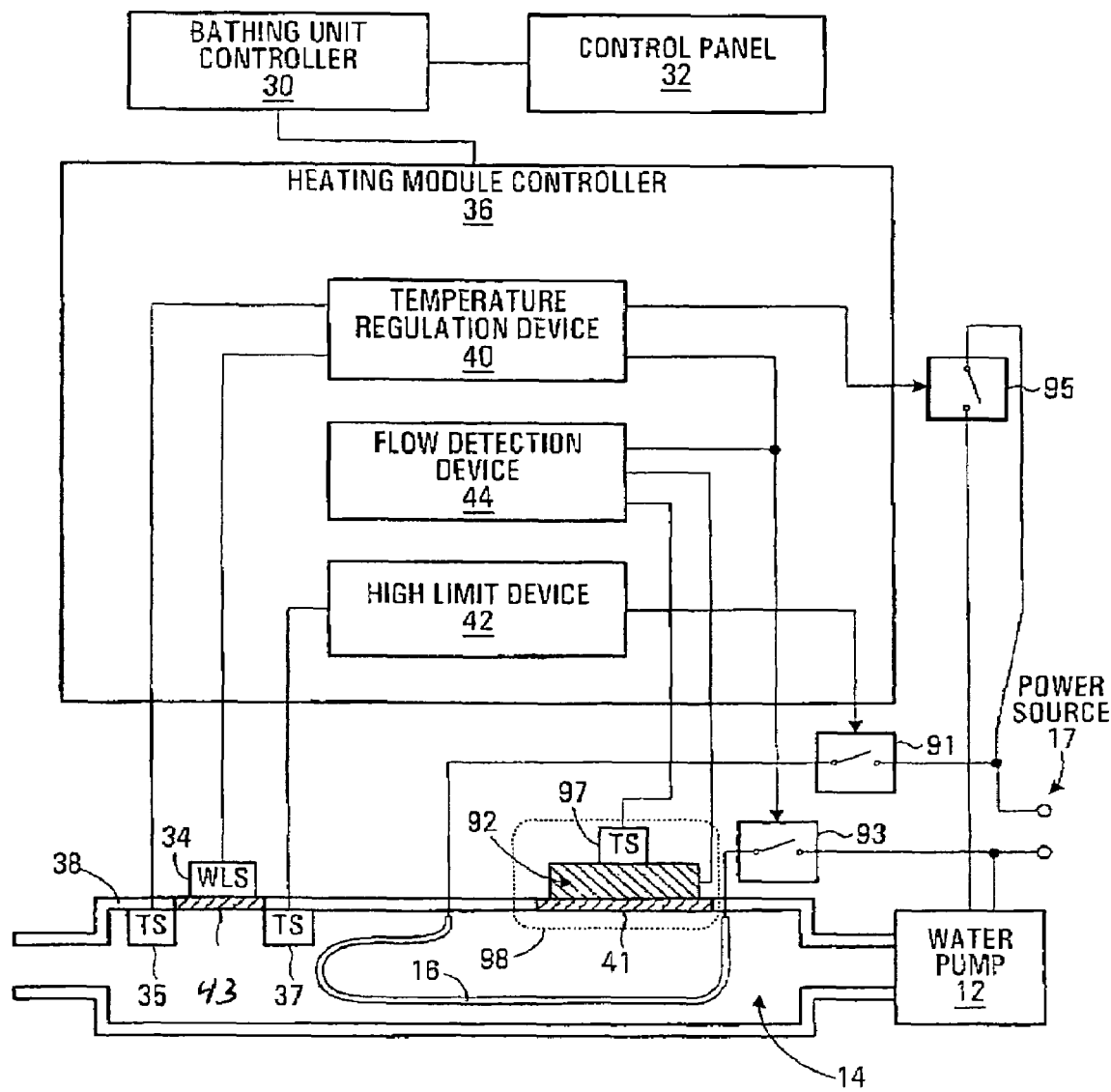
FIG. 2B shows a block diagram of a second non-limiting example of implementation of a control system in communication with a heating module suitable for use with a bathing unit system as shown in FIG. 1.
Figure 2C:
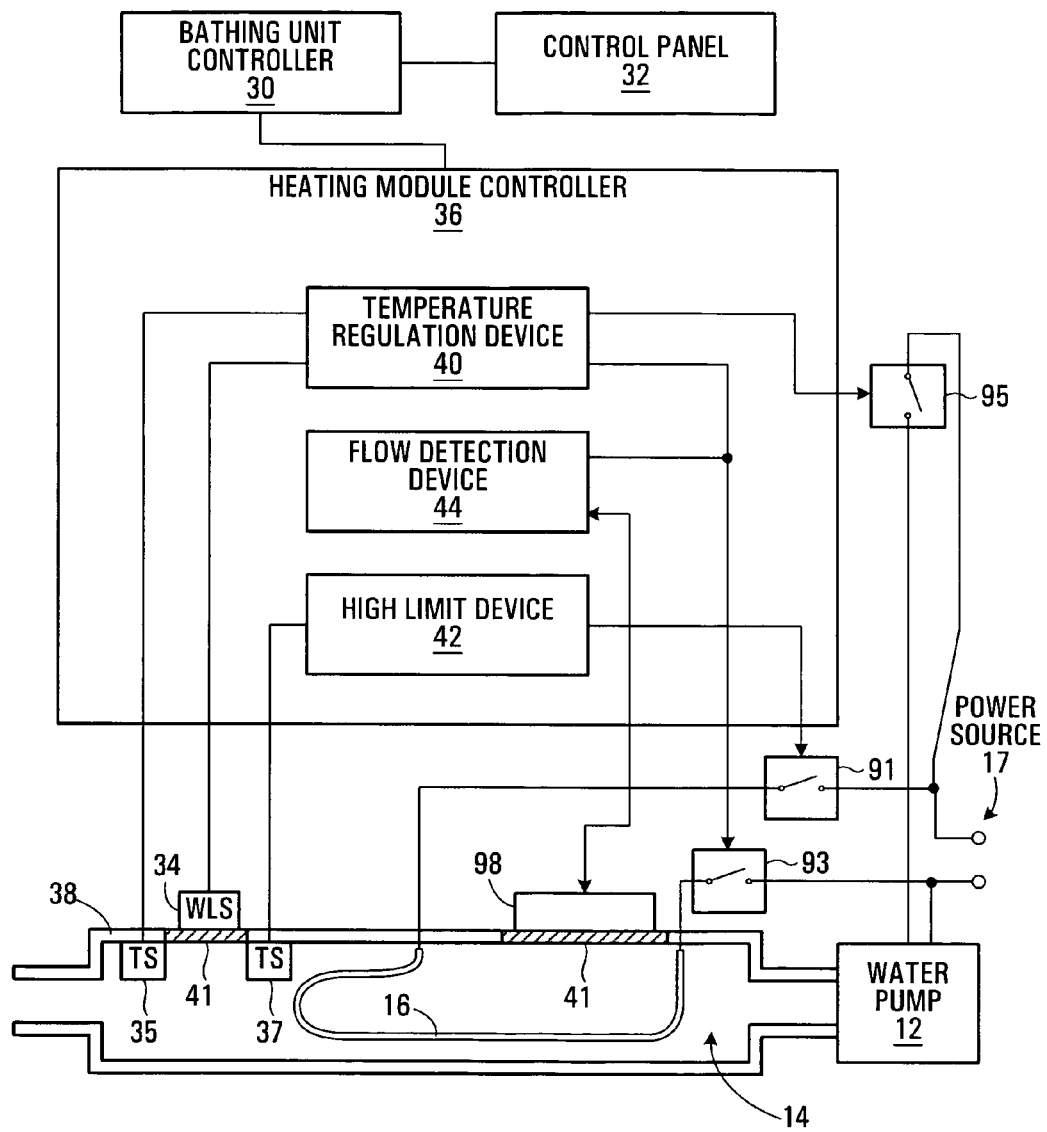
FIG. 2C shows a block diagram of a third non-limiting example of implementation of a control system in communication with a heating module suitable for use with a bathing unit system as shown in FIG. 1.

The heating module controller 36 and the heating module 14 are shown in greater detail in FIGS. 2A, 2B and 2C. The heating module 14 includes a body 38 having an inner surface 27 and an outer surface 29. The body 38 defines a passage through which water can flow. The heating module 14 also includes a heating device 16 that is operative to transfer heat to the water flowing through the passage. In the non-limiting embodiment shown, the heating device 16 is in the form of an electric heating element 16. The heating device 16 is powered by a suitable power source 17 such as a standard household electric circuit. It is to be understood that the water flow passage and heating device 16 can take various respective configurations without departing from the spirit and scope of the present invention. For example, the heating device 16 could be in the form of a gas heater. In an alternative implementation, the heating device 16 includes heating surface components, such as thick film heaters, positioned on the outer and/or inner surfaces of the body 38 of the heating module and which are adapted to heat the water as it flows through the passage.

The body 38 of the heating module 14 can be formed of a conductive material or an electrically non-conductive material. The expression "electrically non-conductive material" refers to a class of materials having substantially low electrical conductivity properties such as plastics, elastomers, ceramics, and selected composite materials. Moreover, the body 38 of the heating module 14 may include a plurality of electrically non-conductive portions, or may be made entirely of such electrically non-conductive materials. In a specific practical implementation, the body 38 of the heating module is formed of an electrically non-conductive portion 43, but comprises one or more conductive portions 41 for providing an electrical path between the water in the heating module 14 and ground.

As shown in FIGS. 2A, 2B and 2C, the heating module controller 36 includes a temperature regulation device 40, a flow detection device 44 and a high limit device 42. The temperature regulation device 40 is operative for controlling the heating of the water flowing through the heating module 14, the flow detection device 44 is operative for detecting the sufficiency of water flow through the heating module 14, and the high limit device 42 is operative for controlling the heating device 16 upon detection of an unsafe water temperature within the heating module 14. Each of these components will now be described in more detail below.

Temperature Regulation Device 40

The temperature regulation device 40 is in communication with a temperature sensor 35 located within the heating module 14. The temperature sensor 35 is operative for providing the temperature regulation device 40 with signals indicative of the temperature of the water. In the non-limiting embodiment shown in FIGS. 1 and 2A 2B and 2C, the temperature sensor 35 is located within the body 38 of the heating module. It should, however, be understood that the temperature sensor 35 can be positioned in other locations, such as within the circulation piping just beyond the heating module 14 without detracting from the spirit of the invention.

The heating module controller 36 includes two actuators 91 and 93 that are associated with the heating device 16 and that are operative for causing the heating device 16 to acquire one of a heating state and a non-heating state. In the embodiment shown, the temperature regulation device 40 and the flow detection device 44 are operative for controlling actuator 93 for causing the heating device 16 to acquire one of the heating state and the non-heating state. Some non-limiting examples of actuators include relays, switches and/or solid state devices, such as TRIACS, MOSFETs etc.

As will be described in more detail below, in normal operation it is the temperature regulation device 40 that is operative for maintaining the water temperature in the water receptacle 18 within a certain temperature range associated to a desired water temperature. The desired water temperature can be a predefined temperature that is stored in a memory of the temperature regulation device 40, or alternatively, the desired water temperature can be a temperature entered by a bather via the control panel 32. In the case where the desired water temperature is entered by a bather, it is stored in a memory unit of the bathing unit controller 30 and transmitted to the temperature regulation device 40 upon request. Preferably, the desired water temperature is between 38 and 41° C. Generally, the certain temperature range associated with the desired water temperature is referred to as the set point range, and is within a few degrees of the desired water temperature. For example, the certain temperature range may be ±1° C. from the desired water temperature. For the sake of example, let us assume that a bather entered the desired temperature of 40° C. As such, the certain temperature range might be from 39° C. to 41° C.

A non-limiting example of a process used by the temperature regulation device 40 for regulating the water temperature in the receptacle will now be described. Firstly, the temperature regulation device 40 activates the water pump 12.

As shown in FIGS. 2A 2B and 2C, the temperature regulation device 40 is in communication with an actuator 95 for causing the water pump 12 to be activated and deactivated. As described above, some non-limiting examples of actuators include relays, switches and TRIACs. In the non-limiting embodiment described herein, the actuator 95 is in the form of a relay.

When activated, the water pump 12 is operative to circulate the water between the water receptacle 18 and the heating module 14 through the circulation pipes. A first reason for circulating water between the water receptacle 18 and the heating module 14 is to cause the water from the water receptacle 18 to pass through the heating module 14 when the heating module 14 is in the heating state, so as to cause the water to flow past the heating device 16 such that it can be heated.

A second reason for circulating the water is to attain a uniform water temperature in the water receptacle 18 and the heating module 14, in order to be able to obtain water temperature measurements from temperature sensor 35 that reflect the water temperature of the water in the water receptacle 18. Often, once the water pump 12 has been de-active for a period of time, the water in the circulation piping and the heating module 14 will be at a different temperature than the water in the water receptacle 18. This could be because the water receptacle 18 is positioned in direct sunlight and the circulation piping and the heating module 14 are positioned under the water receptacle 18 in the shade. Since the temperature sensor 35 is within the body 38 of the heating module 14, it is desirable to circulate the water between the water receptacle 18 and the heating module 14 for a period of time prior to taking a temperature reading so as to ensure that the water temperature in the heating module 14 and in the water receptacle 18 is uniform. A method of controlling the activation/deactivation of the water pump 12 is described in co-pending U.S. patent application Ser. No. 10/768,062 the contents of which are incorporated herein by reference.

Once the temperature regulation device 40 has activated the water pump 12, the temperature regulation device 40 causes the heating module 14 to acquire a heating state, which can take place automatically upon powering up the bathing unit system, for example. Once the heating module 14 has been activated, the temperature regulation device 40 processes signals received from the temperature sensor 35 conveying the water temperature, at least in part on the basis of a desired water temperature. More specifically, the temperature regulation device 40 processes the signal indicative of the water temperature to determine if it has reached an upper limit of a certain temperature range associated to the desired temperature. Once the signal received from the temperature sensor 35 indicates that the water temperature has reached an upper limit of the certain temperature range, the temperature regulation device controls the actuator 93 such that the heating device 16 acquires a non-heating state. Once the heating device 16 is in the non-heating state, the temperature regulation device 40 receives a signal from the temperature sensor 35 conveying the water temperature in the heating module 38 and processes the signal at least in part on the basis of a desired temperature. More specifically, the temperature regulation module 40 processes the signal indicative of the water temperature to determine if it has reached or fallen below a lower limit of a certain temperature range associated to the desired temperature. Once the signal received from the temperature sensor 35 is indicative that the water temperature has reached or fallen below a lower limit of the certain temperature range, the temperature regulation device 40 controls the actuator 93 such that the heating device 16 once again acquires the heating state.

Based on the above description of the process used by the temperature regulation device 40 to regulate the water temperature, it should be noticed that when the heating device 16 is in the heating state, the temperature regulation device 40 monitors the temperature of the water such that when the water temperature approaches or exceeds the upper limit of a certain temperature range, the heating module 14 is caused to acquire a non-heating state. Likewise, when the heating device 16 is in the non-heating state, the temperature regulation device 40 monitors the temperature of the water such that when the water temperature approaches or falls below the lower limit of the certain temperature range, the heating module is caused to acquire a heating state.

In summary, the temperature regulation device 40 is operative for controlling actuator 93 in order to cause the heating module 14 to acquire one of a heating state and a non-heating state. When the water in the water receptacle 18 reaches the lower limit of the certain temperature range, the temperature regulation device 40 controls the actuator 93 so as to cause the heating module 14 to acquire a heating state. Conversely, when the water in the water receptacle 18 reaches the upper limit of the certain temperature range, the temperature regulation device 40 controls the actuator 93 so as to cause the heating module 14 to acquire a non-heating state. In this manner, the temperature regulation device 40 is able to keep the water temperature within the certain temperature range associated to the desired water temperature.

High Limit Device 42

Since it is the temperature regulation device 40 that is responsible for maintaining the water temperature within the certain temperature range during normal operation, the high limit device 42 is hardly ever used. Instead, the high limit device 42 acts as a backup safety device that activates when the temperature regulation device 40, or the actuator 93 controlled by the temperature regulation device 40, ceases to function properly. As such, the high limit device 42 ensures that the water temperature in the water receptacle 18 remains at a safe temperature in the case of a malfunction of either the temperature regulation device 40 or the actuator 93.

As shown in FIGS. 2A 2B and 2C, the high limit device 42 is in communication with a different temperature sensor 37 than the temperature regulation device 40 and a different actuator 91 for causing the heating device 16 to acquire a non-heating state. The temperature sensor 37 is operative for obtaining temperature measurements of the water within the heating module 14. The fact that the temperature sensor 37 is different than the temperature sensor 35 provides an additional security feature required by the UL standard. In the non-limiting embodiment shown in FIGS. 1, 2A, 2B and 2C, the temperature sensor 37 is located within the body 38 of the heating module. It should, however, be understood that the temperature sensor 37 can be positioned in other locations, such as within the circulation piping just beyond the heating module 14 without detracting from the spirit of the invention. In a non-limiting embodiment, both the temperature sensor 35 and the temperature sensor 37 are installed within the same housing.

As described above, the high limit device 42 is operative for ensuring that the water temperature in the water receptacle 18 does not exceed a certain threshold above the certain temperature range, such as 50° C., for example. When the water temperature reaches the certain threshold, the high limit device 42 controls the actuator 91 for causing the heating device 16 to acquire the non-heating state. In a non-limiting example of implementation not shown, the high limit device 42 can be operative for controlling both of the actuators 91 and 93 for added security. In the non-limiting embodiment shown in FIGS. 2A 2B and 2C, the actuator 91 is a relay.

In the case where there is a failure of the temperature regulation device 40 or the actuator 93, such that the high limit device 42 causes the heating device 16 to acquire the non-heating state, the failure can be communicated to a bather via a visual or audio signal. For example, the visual indication may be provided to a user via a console, the control panel 32, the bathing unit controller 30 or any other manner known in the art. In this manner, the heating module controller 36 can provide diagnostic information to the bather indicative of when and where the failure occurred.

In a non-limiting example of implementation that is not shown in FIGS. 2A 2B and 2C, the heating module controller 36 might also include a regulation backup device as a further safety feature. A system that includes both a high limit device 42 and a regulation backup device is disclosed in co-pending U.S. patent application Ser. No. 10/768,062, the contents of which are incorporated herein by reference.

Water Level Sensor 34

In the description provided above, the temperature regulation device 40 has been described as processing the signals received from the temperature sensor 35 at least in part on the basis of a desired water temperature in order to control the actuator 93. It should be understood, however, that in an alternative embodiment, the temperature regulation device 40 includes programming logic adapted for processing the signal received from the temperature sensor 35 in combination with other parameters as well.

For example, in the non-limiting embodiment shown in FIGS. 2A 2B and 2C, the temperature regulation device 40 is also in communication with a water level sensor 34. The water level sensor 34 can be any type of water level sensor for obtaining a reading of the water level in the heating module 14. In a non-limiting embodiment, the water level sensor 34 is a capacitive water level sensor 34 adapted for obtaining a capacitance measurement associated to a level of water in the heating module 14. In the case where the heating module 14 is in communication with a capacitive water level sensor, the body 38 of the heating module 14 includes an electrically non-conductive portion 43. A more detailed description of a capacitive water level sensor can be found in co-pending U.S. patent application Ser. No. 10/651,949 the contents of which are incorporated herein by reference.

As such, in a non-limiting embodiment, the temperature regulation device 40 is operative for controlling the actuator 93 at least in part on the basis of the capacitance measurement associated to a level of water in the heating module 14. For example, if the capacitance measurement is indicative that there is a low level of water in the heating module 14 then the temperature regulation device 40 may control actuator 93 such that the heating device 16 either acquires the non-heating state or remains in the non-heating state, so as not to cause damage to any of the components of the heating module 14.

Flow Detection Device 44

In a further non-limiting example of implementation, the temperature regulation device 40 is also in communication with the flow detection device 44, such that the temperature regulation device 40 can control the actuator 93 at least in part on the basis of the sufficiency of water flow through the heating module 14. For example, if the flow detection device 44 detects that there is insufficient water flow through the heating module 14, it can communicate this information to the temperature regulation device 40, such that the temperature regulation device 40 may control actuator 93 such that the heating device 16 either acquires the non-heating state or remains in the non-heating state.

In alternative embodiments, such as the ones shown in FIGS. 2A 2B and 2C, the flow detection device 44 is in direct communication with the actuator 93 such that upon detection of insufficient water flow through the heating module 14, the flow detection device 44 itself can control the actuator 93. In this manner, the flow detection device 44 is operative for causing the heating device 16 to either acquire the non-heating state or remain in the non-heating state, upon detection of an insufficient level of water flow within the heating module 14. As such, the flow detection device 44 does not need to be in communication with the temperature regulation device 40 in order to control the heating device 16.

In accordance with the present invention, the flow detection device 44 is in communication with a temperature sensing entity 98. Shown in FIG. 2A is a temperature sensing entity 98 in accordance with a first non-limiting example of implementation, shown in FIG. 2B is a temperature sensing entity 98 in accordance with a second non-limiting example of implementation, and shown in FIG. 2C is a temperature sensing entity 98 in accordance with a third non-limiting example of implementation. In the first non-limiting example of implementation shown in FIG. 2A, the temperature sensing entity 98 acts as the actuator 93 that is controlled by the temperature regulation device 40 and the flow detection device 44 for activating/deactivating the heating device 16. In the second and third non-limiting embodiments shown in FIGS. 2B and 2C, the temperature sensing entity 98 is controlled separately from the heating device 16.

Figure 3A:
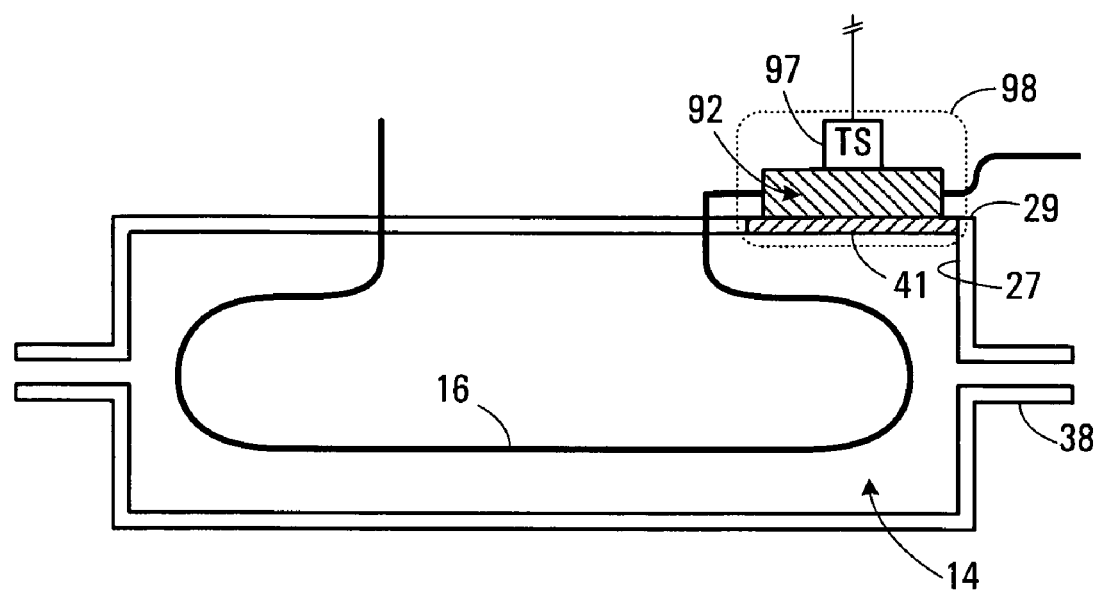
FIG. 3A shows an expanded view of the heating module of FIG. 2A.
Figure 3B:
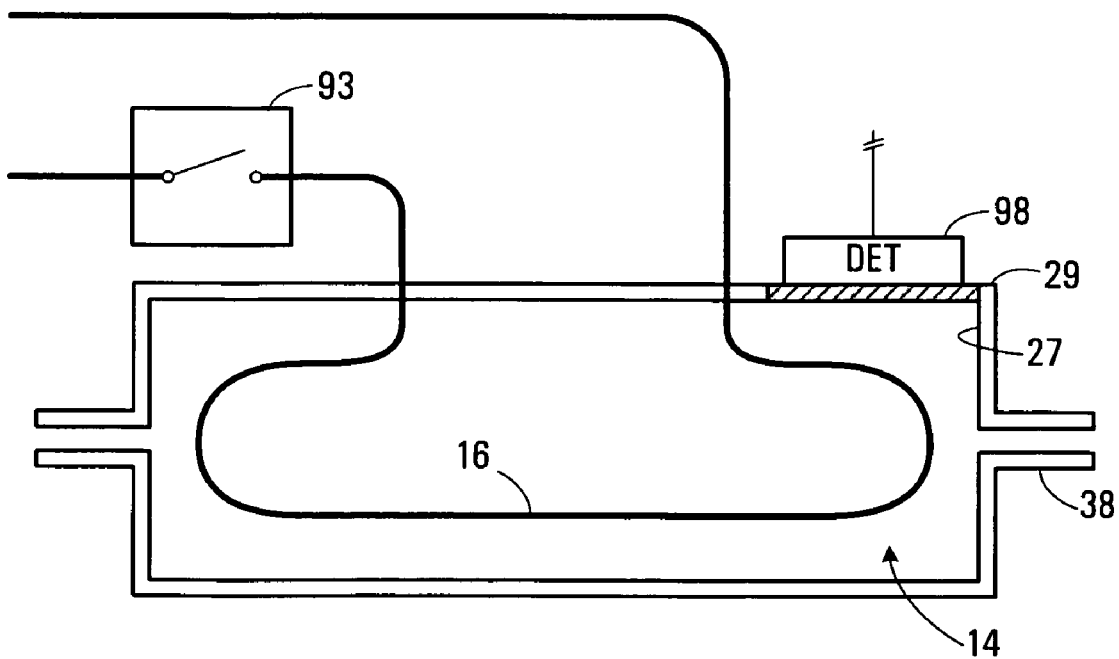
FIG. 3B shows an expanded view of the heating module of FIG. 2C.

FIG. 3A shows an expanded view of the heating module of FIG. 2A and FIG. 3B shows an expanded view of the heating module of FIG. 2C.

In these three embodiments (FIGS. 2A, 2B and 2C), the temperature sensing entities 98 are in communication with a thermally conductive portion 41 of the heating module 14, such that the temperature sensing entities 98 are in thermally conductive communication with the water flowing through the body 38 of the heating module 14. In addition, in the embodiments shown in FIGS. 2A and 2B, each of the temperature sensing entities 98 is comprised of a thermal element 92 in communication with a thermal sensor 97. The thermal sensor 97 is operative for providing the flow detection device 44 with temperature information associated to the thermal element 92. In the embodiments shown in FIGS. 2A and 2B, the thermal sensor 97 is mounted to the thermal element 92 to form the temperature sensing entity 98.

In specific practical examples of implementation, the thermal element 92 may include a heating component (usually a resistor) thermally coupled to a thermal sensor 97 in the form of a temperature sensitive component (usually a thermistor, RTD or thermocouple). In such a combination a suitable thermal coupling between the thermal sensor 97 and the thermal element 92 must be made in order form a reliable temperature sensing entity 98.

Alternatively, in either one of the embodiments depicted in FIGS. 2A and 2B, the temperature sensing entity 98 may be embodied in a unitary thermal component that combines the functionality of the thermal sensor 97 and the thermal element 92. FIG. 2C depicts the same embodiment shown in FIG. 2B with the temperature sensing entity 98 embodied in a unitary thermal component. The temperature sensing entity 98 shown in FIG. 2C provides at the same time heating capability and information about its own temperature. In a specific embodiment, the temperature sensing entity 98 is a solid state device, such as a Thermistor, PTC, FETs, MOSFETs, JFETs and BJT (bipolar junction transistors).

In such an implementation the temperature measurements are derived from the physical properties of the unitary thermal component of the temperature sensing entity 98. For example, well-known relationships between temperature and voltage in solid state devices can be used to obtain temperature information associated with the temperature sensing entity 98.

For example, the relationship between temperature and voltage drop across a PN junction in a solid state device is well-known in the art of integrated circuit design. As such we will not be describing these properties further here. Generally speaking, inside the dynamic range of operation of a transistor, the relationship between voltage and temperature is about:

$$-2 \text{ mV/}° \text{C. per P-N junction}$$

In a first practical implementation, the temperature sensing entity 98 includes a transistor, the transistor including a base and an emitter. In this implementation, obtaining a temperature measurement associated with the temperature sensing entity is performed by obtaining a voltage measurement between the base and emitter of the transistor and processing the voltage measurement to derive the corresponding temperature measurement.

In another specific practical implementation, the temperature sensing entity 98 includes a Darlington transistor, having a double PN junction for the base-to-emitter which provides a −4 mV/° C. slope.

Figure 12:
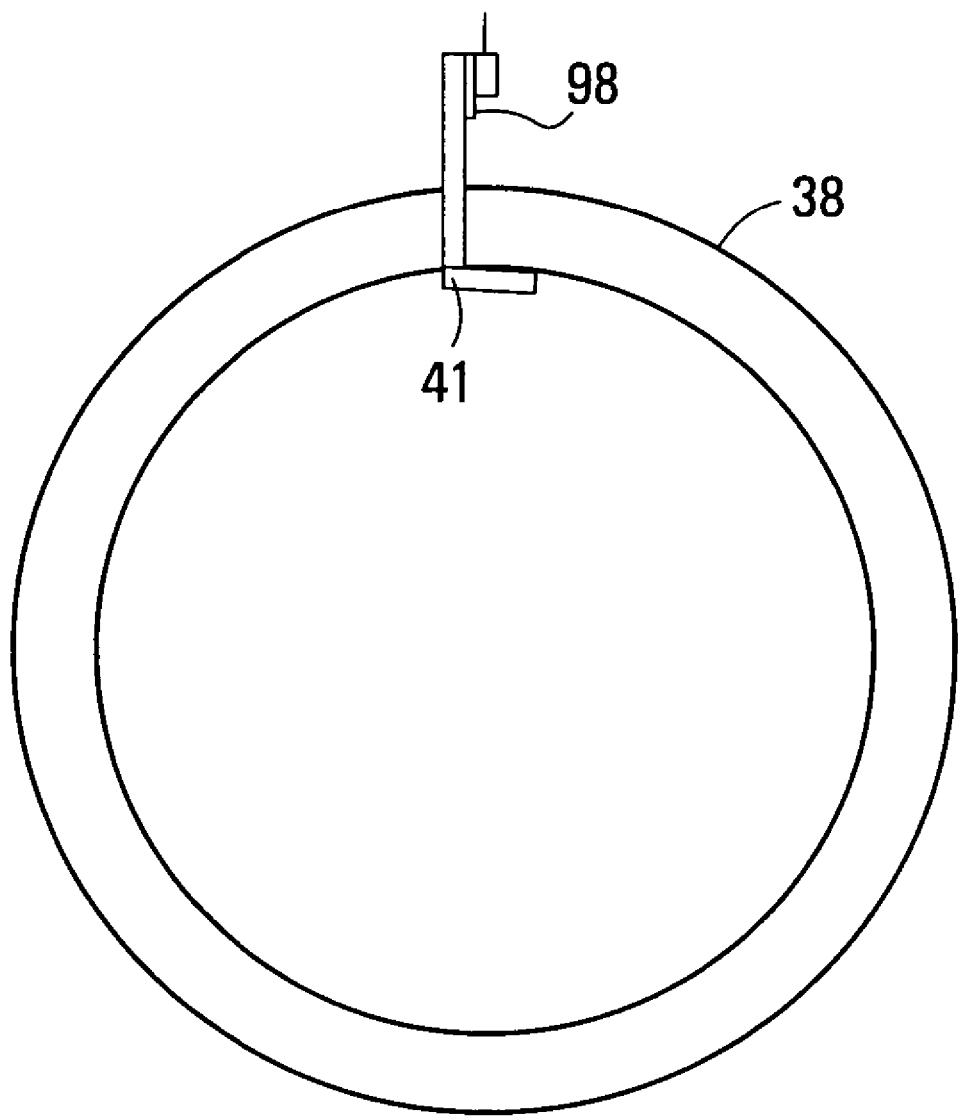
FIG. 12 is a cross-section of a heating module depicting a temperature sensing entity in communication with thermally conductive portion of the heating module in accordance with a specific example of implementation of the invention.

In a specific implementation, as shown in FIG. 12, the temperature sensing entity 98, embodied as a transistor, is placed on a metallic member, which acts as the thermally conductive portion 41 of the heating module 14. In the non-limiting example depicted in FIG. 12, the transistor 98 is attached to a small 1.25"×0.5" aluminium metallic member 41 bent at about 90°, with its bent portion placed along the inner wall of the body 38 of the heating module 14. As shown, the metallic member 41 goes through the body 38 of the heating module 14, which may be made of plastic or any other suitable material. It will be apparent to the person skilled in the art that may other implementations for the temperature sensing entity 98 and the thermally conductive portion 41 of the heating module 14 are possible and that the embodiment described herein was described for the purpose of illustration only.

The metallic member 41 is in contact with water flowing through the body 38 of the heating module 14. Thus the metallic member 41 is heated by the transistor 98 and cooled by the water flowing through the body 38 of the heating module 14. As such, the water flowing through the body 38 of the heating module 14 acts as a heatsink having a variable thermal resistance. The metallic member 41 can be of any shape and can be made of any suitable conductive material, including but not limited to, aluminium and copper.

Advantageously, by using the physical properties of the temperature sensing entity 98 to derive temperature information, the use of separate thermal sensors and thermal elements can be avoided and therefore the need to provide a suitable coupling between a thermal sensor and a thermal element is also avoided. Although the specific example described above describes the use of a transistor in the temperature sensing entity 98, any other suitable type of device combining the functionality of the thermal sensor 97 and the thermal element 92 can be used to implement the unitary thermal component without detracting from the spirit of the invention.

As mentioned above, in the case where the heating device 16 is activated and there is insufficient water flow within the heating module 14, a situation commonly referred to as a "dry fire" can occur, which could cause the components within the heating module 14, such as the temperature sensors 35, 37 and the heating device 16 itself, to be damaged. Such a situation can also occur in the case where there is water flow within a lower portion of the heating module, but a pocket of air in the upper portion of the heating module 14, such that a portion of the heating device 16 is not covered by water.

As such, it is desirable that the heating module controller 36 is operative for detecting whether there is sufficient flow within the body 38 of the heating module 14 prior to activating the heating device 16 for an extended period of time. As mentioned above, the flow detection device 44 is operative for detecting the sufficiency of water flow within the body 38 of the heating module 14. The process used by the flow detection device 44 for detecting the sufficiency of water flow within the heating module 14 will now be described in more detail with respect to the flow chart shown in FIG. 4. It should be understood that this flow chart is applicable to the embodiments shown in FIGS. 2A 2B and 2C.

At step 100 the flow detection device 44 causes the water pump 12 to be activated so as to initiate the flow of water through the heating module 14. In the case where the flow detection device 44 is not in direct communication with the actuator 95, as shown in FIGS. 2A 2B and 2C, the flow detection device 44 issues a signal to the temperature regulation device 40 for causing the temperature regulation device 40 to control actuator 95 for activating the water pump 12.

At step 120, once the water pump 12 has been activated, the flow detection device 44 causes the temperature sensing entity 98 to acquire a certain temperature condition. For example, and as will be described in more detail further on in the description with respect to each of the two embodiments, the certain temperature condition of the temperature sensing entity 98 can include a temperature that is above or below the temperature sensing entity's 98 temperature prior to the initiation of the water pump 12, and/or a temperature that is above or below the temperature of the water in the heating module 14.

In the specific example of implementation where the temperature sensing entity 98 is embodied as a unitary thermal component, such as a transistor, the temperature sensing entity 98 is activated, and therefore heated up, by using it as a current source.

At step 140, once the temperature sensing entity 98 has acquired a temperature condition, the flow detection device 44 obtains temperature information associated to the temperature sensing entity 98. In a non-limiting embodiment, in which the temperature sensing entity 98 is comprised of a thermal element 92 and a thermal sensor 97, the flow detection device 44 obtains the temperature information associated to the thermal element 92 from the thermal sensor 97. In accordance with some non-limiting examples, the temperature information can be indicative of the temperature of the thermal element 92 at a given point in time, or the temperature information can be indicative of a rate of temperature increase or decrease of the thermal element 92. In another non-limiting embodiment, in which the temperature sensing entity 98 is embodied in a unitary thermal component, the flow detection device 44 obtains temperature information associated to the temperature sensing entity 98 by obtaining information on the basis of the physical characteristics of the unitary thermal component. For example, the voltage drop across a P-N junction in a transistor can be measured and the corresponding temperature derived at the flow detection device 44 on the basis of well-known properties. The temperature information can be indicative of the temperature of the temperature sensing entity 98 at a given point in time, or the temperature information can be indicative of a rate of temperature increase or decrease of the temperature sensing entity 98.

Finally, at step 160, the flow detection device 44 detects the sufficiency of water flow through the body 38 of the heating module 14 on the basis of the temperature information associated to the temperature sensing entity 98. For example, on the basis of the temperature of the temperature sensing entity 98 at a given point in time, or on the basis of the rate of temperature increase or decrease, the flow detection device 44 is operative for determining the sufficiency of water within the heating module 14.

The above process for determining the sufficiency of water within the body of the heating module will now be described in more detail with respect to each of the embodiments shown in FIGS. 2A 2B and 2C, as well as the more detailed flow charts shown in FIGS. 5 and 8.

The Embodiment of FIG. 2A

As mentioned above, in the non-limiting embodiment shown in FIG. 2A, the temperature sensing entity 98 acts as the actuator 93 that is controlled by the temperature regulation device 40 and the flow detection device 44 for activating/deactivating the heating device 16. In this non-limiting embodiment the actuator 93 for controlling the heating device 16 is a solid state device, such as a TRIACs, SCRs, FETs, IGBTs, MOSFETs, JFETs and BJT (bipolar junction transistors). For the purposes of the present description, the actuator 93 is a TRIAC. In the specific embodiment depicted in FIG. 2A, the temperature sensing entity 98 is comprised of a thermal element 92 and a thermal sensor 97.

As is known in the art, solid state devices must be sufficiently cooled in order to maintain their operating properties. This cooling is typically achieved through the use of heat sinks. In the embodiment shown in FIG. 2A, the actuator 93 is in thermally conductive communication with the water that flows through the heating module 14, via the thermally conductive portion 41 of the body 38. As such, the water flowing through the body 38 of the heating module 14 acts as a heat sink to cool the solid state actuator 93. As best shown in FIG. 3, the actuator 93 is mounted to the outer surface 29 of the heating module 14, such that it is in communication with the thermally conductive portion 41 of the body 38 that extends from the inner surface 27 of the heating module 14 to the outer surface 29. As such, the actuator 93 is in thermally conductive communication with the water flowing through the heating module 14.

It should be understood that the actuator 93 can be mounted to the thermally conductive portion 41 of the heating module 14 in any manner known in the art, such as by adhesive or mechanical fasteners, such as compression brackets, for example. In a non-limiting example of implementation, the actuator 93 is mounted to the outer surface 29 of the heating module 14 by one or more compression brackets.

Figure 4:
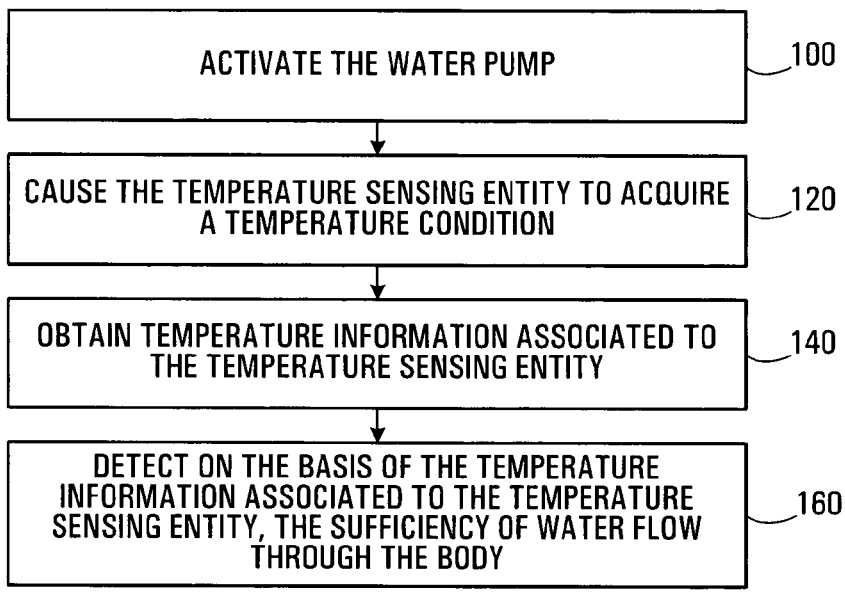
FIG. 4 shows a flow diagram of a method for detecting the sufficiency of water flow through a heating module in accordance with a non-limiting example of implementation of the present invention.
Figure 5:
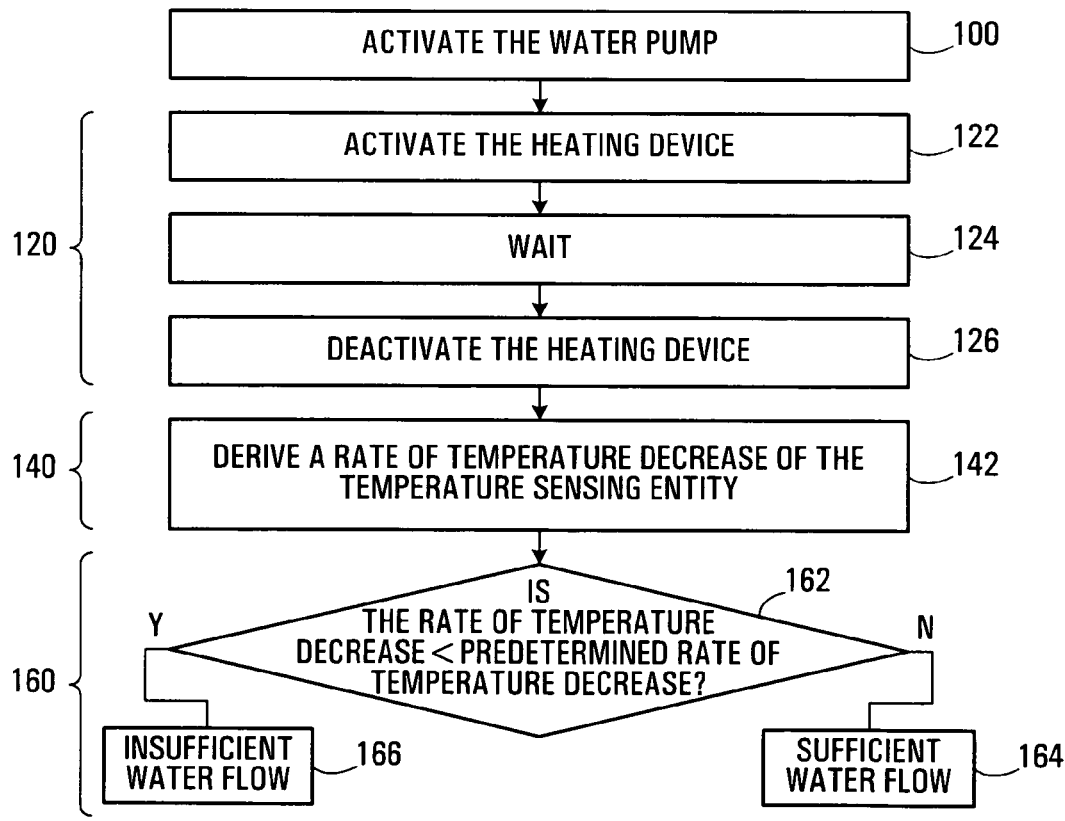
FIG. 5 shows a non-limiting example of a flow diagram of a method for detecting the sufficiency of water flow through a heating module as implemented by the control system of FIG. 2A.

Shown in FIG. 5, is a non-limiting example of a method used by the flow detection device 44 for detecting the sufficiency of water within the heating module 14 when the thermal element 92 is the solid state actuator 93, as shown in FIG. 2A. The steps shown in the flow chart of FIG. 5 expand on the general steps 100, 120, 140 and 160 as described above with respect to FIG. 4. As such, the general steps 100, 120, 140 and 160 are positioned next to the expanded steps shown in FIG. 5, in order to indicate which of the expanded steps fall within the general steps 100, 120, 140 and 160.

It should be understood that the flow detection device 44 can perform the following method in order to detect the sufficiency of water within the heating module upon start up of the bathing unit, and/or at predetermined time intervals during the course of operation of the bathing unit. Alternatively, the flow detection device 44 can perform the following procedure upon receipt of a signal entered by a user of the bathing unit indicative that the user would like to perform a flow detection operation.

Referring now to FIG. 5, the first step in the process used by the flow detection device 44 when the thermal element 92 is the actuator 93 is to activate the water pump 12 in order to initiate the water flowing through the body 38 of the heating module 14. Obviously there will be no flow of water through the heating module 14 if the water pump 12 has not been activated. In a non-limiting example of implementation, the water pump 12 is activated for approximately 1 minute prior to commencing the next step in the procedure, in order to ensure that the water in the water receptacle 18, in the circulation piping, and in the heating module 14 are at approximately the same temperature.

Once the water pump 12 has been activated, the flow detection device 44 causes the solid state actuator 93 to acquire a temperature condition (step 120 of FIG. 4). For the purposes of this example, the temperature condition is an increased temperature. As such, in order to cause the actuator 93 to acquire an increased temperature, at step 122, the flow detection device 144 activates the actuator 93 such that the heating device 16 is caused to acquire a heating state. It is generally known in the art that when solid state devices, such as TRIACs, are activated, meaning that they enable power to be provided to a component, they increase in temperature. This is due to the current that passes through the triac when activated. As such, in order to cause the actuator 93 to acquire an increased temperature, the flow detection device 44 simply needs to activate the actuator 93 such that it provides power to the heating device 16. At step 124, the flow detection device 44 waits a predetermined period of time, such as 3 seconds.

Following this, at step 126, the flow detection device 44 deactivates the heating device 16. As such, the heating device 16 is only activated for a short period of time. Once the heating device 16 has been deactivated, the actuator 93 will have acquired an increased temperature that is higher than that of the water within the heating module 14. Although 3 seconds is mentioned above, it should be understood that the flow detection device 44 can wait any period of time so long as it is short enough to avoid damaging the components of the heating module 14 if there is insufficient water flow through the heating module 14, but long enough to cause the solid state actuator 93 to acquire an increased temperature. Alternatively, the heating device 16 may be activated for a longer period of time, but at a reduced capacity, such as at 25% of its nominal capacity, for example. In cases where the temperature sensing entity 98 comprises a solid state device, it has been observed that by allowing the heating period (i.e. step 124) to be long enough to allow the P-N junction of the solid state device to rise by about 10° C. improved performance results can be obtained.

Once the actuator 92 has acquired the temperature condition, which in this non-limiting example is an increased temperature, the flow detection device 44 then obtains temperature information associated to the solid state actuator 93 (step 140 as described above with respect to FIG. 3). In the non-limiting example of implementation described herein, the temperature information associated to the thermal element 92 is a rate of temperature decrease. It should be understood that the temperature of the solid state actuator 93 may not begin to decrease until a few seconds after the heating device 16 has been deactivated. As such, it may be necessary to wait a few seconds before proceeding to step 142.

As such at step 142, the flow detection device 44 derives a rate of temperature decrease of the solid state actuator 93 on the basis of one or more signals received from the temperature sensor 97. As will be appreciated by those skilled in the art, once the solid state actuator 93 is no longer being heated, or being maintained at the increased temperature, the temperature of the solid state actuator 93 will begin to decrease in temperature so that it begins to move towards the temperature of the water within the heating module 14. In addition, when the solid state actuator 93 is in thermally conductive communication with the water flowing through the body 38 of the heating module 14, the rate of temperature decrease of the solid state actuator 93 will be dependent on whether there is a flow of water within the heating module 14. More specifically, in the case where there is no flow, or very little flow, the rate of temperature decrease will be less than the rate of temperature decrease when there is more water flow through the body 38 of the heating module 14.

In a first non-limiting embodiment, in order to derive the rate of temperature decrease of the solid state actuator 93, the flow detection device 44 receives one or more signals from the temperature sensor 97 indicative of the temperature of the solid state actuator 93 at different points in time. On the basis of these signals, the flow detection device 44 can then calculate the rate of temperature decrease of the solid state actuator 93. In an alternative non-limiting embodiment, the temperature sensor 97 is operative for calculating the rate of temperature decrease directly. As such, the temperature sensor 97 simply provides the flow detection device 44 with a signal indicative of the rate of temperature decrease of the solid state actuator 93.

Once the flow detection device 44 has obtained the temperature information associated to the solid state actuator 93, which in the case of the present example is the rate of temperature decrease, the flow detection device 44 detects the sufficiency of water flowing through the body 38 on the basis of that temperature information (step 160 as described above with respect to FIG. 3). More specifically, in the embodiment described herein, at step 162, the flow detection device 44 determines whether there is a sufficiency of water flow within the body 38 by determining whether the rate of temperature decrease detected at step 142 is less than a predetermined rate of temperature decrease stored in a memory. The predetermined rate of temperature decrease may be a standard value associated to the size of the heating module 14 and may be stored in the memory of the heating module controller 36 by the manufacturer of the bathing unit system 10. Alternatively, the predetermined rate of temperature decrease may be a value selected by a user based on a specific safety level and may be entered into the memory of the heating module controller 36 by the user via the control panel 32. In yet another alternative example, the predetermined rate of temperature decrease can be a dynamic value that is derived by the flow detection device 44 on the basis of certain environmental parameters, such as the ambient air temperature and the temperature of the water in the heating module. As such, depending on these environmental parameters the predetermined rate of temperature decrease can vary.

At step 164, in the case where the rate of temperature decrease of the solid state actuator 93 is equal to, or greater, than the predetermined rate of temperature decrease, the flow detection device 44 determines that there is sufficient water flow within the body 38 of the heating module 14. When the flow detection device 44 determines that there is sufficient flow within the body 38 of the heating module 14, the functions of the heating module controller 36 can proceed as usual. For example, the flow detection device 44 will allow the temperature regulation device 40 to activate the heating device 16 for causing the water in the heating module 14 to be heated.

At step 166, in the case where the rate of temperature decrease of the solid state actuator 93 is less than the predetermined rate of temperature decrease, the flow detection device 44 determines that there is an insufficient level of water flow within the body 38 of the heating module 14. When the flow detection device 44 determines that there is an insufficient level of water flow within the body 38 of the heating module 14, many things can happen.

In a first non-limiting example of implementation, in the case where the flow detection device 44 detects an insufficiency of water flow within the heating module 14, the flow detection device 44 can control the actuator 93 such that the heating device 16 either acquires the non-heating state or remains in the non-heating state. As such, the heating device 16 prevents the heating module 14 from heating up, which could cause damage to one or more of the components within the heating module 14. In this manner, when the flow detection module 44 detects an insufficient level of water flow within the heating module, the flow detection module 44 essentially shuts down the capability of heating the water.

In a second non-limiting example of implementation, in the case where the flow detection device 44 detects an insufficiency of water flow, the flow detection device 44 issues either an audio or visual cue to the user of the bathing unit system in order to indicate that there may be an insufficient level of water flow within the heating module 14. For example, the flow detection device 44 may cause a siren, or whistle to go off, thereby providing an audio cue. Alternatively, in the case where the bathing unit component includes a display screen, such as on the control panel 32 for example, the flow detection device 44 can cause a visual cue, such as text, in order to indicate to a user that there may be an insufficient level of water flow within the heating module 14. As such, on the basis of these audio or visual cues, the user can check the heating module 14, in order to determine whether there is in fact insufficient water flow within the heating module 14.

It should be understood that for the purposes of the present description, the term "insufficient level of water flow" is indicative of a level that could potentially be dangerous or harmful to the bathing unit system. Obviously, depending on the size of the body 38 of the heating module 14, and the temperatures to which the water is being heated, different levels of water flow may be considered "insufficient".

Figure 6A:
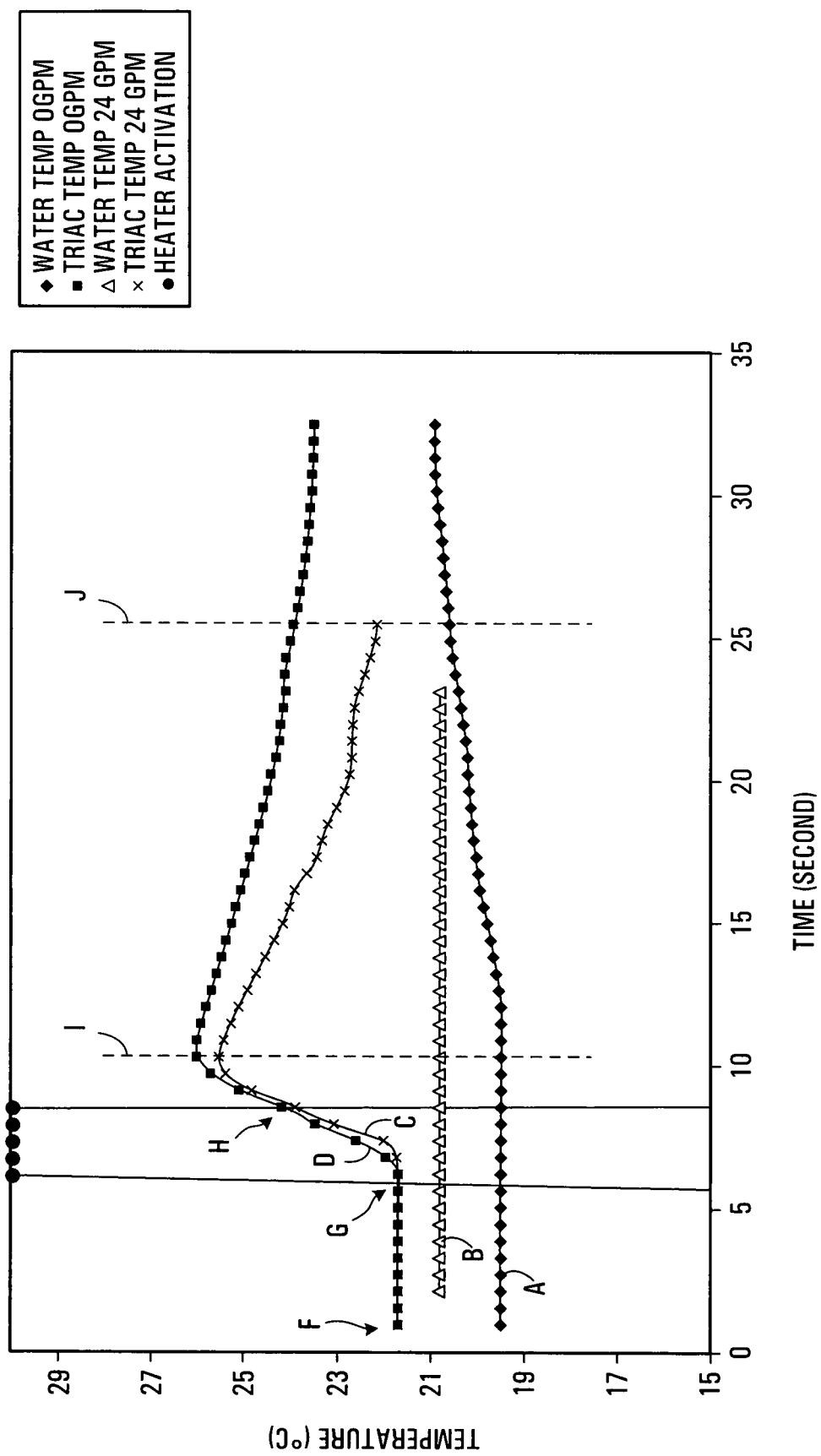
FIG. 6a shows a first graph of the rates of temperature change of a temperature sensing entity and water flowing through a heating module under two different condition, namely: a) water no flow; b) water with flow.

Shown in FIG. 6a, is a graph depicting the process described above with respect to FIG. 5. Line A represents the temperature of the water in the heating module when there is an insufficient level of water flow within the heating module 14, line B represents the temperature of the water in the heating module 14 when there is a sufficient level of water flow within the heating module 14, line C represents the temperature of the solid state actuator 93 when there is a sufficient level of water flow within the heating module 14 and line D represents the temperature of the solid state actuator 93 when there is an insufficient level of water flow within the heating module 14. Between points F and G, the water pump 12 is activated. As shown, there is no change in the temperatures of the water or solid state actuators during that period of time. Then, at point G, the heating device 16 is activated, as per step 122 of FIG. 5. At point H, the heating device 16 is deactivated as per step 126 of FIG. 5. As such, between points G and H, the temperatures of the solid state actuators 93 increase, however, the heating device 16 is activated for such a short period of time that the temperature of the water within the heating module 14 does not really have a chance to heat up. As shown between points H and I, even after the heating device 16 has been deactivated, the temperatures of the solid state actuators 93 continue to increase. Then, between points I and J, the temperatures of the solid state actuators 93 decrease. As shown, in the case of line C, which represents the temperature of a solid state actuator 93 in the case where there is a sufficient flow of water, the rate of temperature decrease is greater than the rate of temperature decrease of line D, which represents the temperature of a solid state actuator 93 in the case where there is an insufficient level of water flow within the heating module. As such, depending on the rate of temperature decrease of the solid state actuator 93, the flow detection device 44 is operative to determine whether there is a sufficient level of flow within the heating module 14.

In the example described above, the temperature information associated to the thermal element 92 (i.e. solid state actuator 93) that was used to determine the sufficiency of water within the heating module 14 was the rate of temperature decrease of the thermal element 92. It should be understood however that the flow detection device 14 could have used other temperature information associated to the thermal element 92. For example, the temperature information associated to the thermal element 92 could have been whether the temperature of the thermal element 92 dropped to a certain temperature within a certain time period. More specifically, the temperature information might be whether the temperature of the thermal element 92 has reached a certain temperature after a certain amount of time. For example, the certain amount of time might be 20 seconds after the heating device 16 has been deactivated. As such, the thermal sensor 97 would take a temperature reading of the thermal element 92 after the 20 seconds has elapsed. The flow detection device 44 would then compare the temperature reading of the thermal element 92 at that time to a predetermined temperature. In a non-limiting example of implementation, the predetermined temperature is the temperature of thermal element 92 prior to the activation of the heating device 16 plus 1 degree. It should be understood, however, that the predetermined temperature could be any temperature that is appropriate.

If the temperature reading of the thermal element 92 reached or exceeded the predetermined temperature at the certain time period, the flow detection device 44 would determine that there is sufficient flow within the body of the heating module 14. However, if the temperature reading of the thermal element 92 had not reached the predetermined temperature at the certain time period, the flow detection device 44 would determine that there is insufficient flow within the body of the heating module 14.

In yet another alternative embodiment, the temperature information associated to the thermal element 92 could have been the maximum temperature obtained by the solid state actuator 93 (i.e. point 1 on the graph shown in FIG. 6a). As such, in order to detect the sufficiency of water flow in the heating module on the basis of the thermal element (i.e. step 160), the flow detection device 44 could have determined whether the maximum temperature obtained by the thermal element 93 was above a predetermined value. In the case where the maximum temperature obtained by the thermal element 93 was above a predetermined value, then the flow detection device 44 would determine that there is an insufficient level of water flow within the heating module 14. However, in the case where the maximum temperature obtained by the thermal element 93 is below a predetermined value, then the flow detection device 44 would determine that there is a sufficient flow of water within the heating module 14. As shown in FIG. 6a, in the case of line C which represents the temperature of the solid state actuator 93 when there is a sufficient flow of water through the heating module 14, the maximum temperature obtained by the solid state actuator 93 is less than in the case of line D which represents the temperature of the solid state actuator 93 when there is an insufficient level of water flow through the heating module 14.

In yet another alternative embodiment, the temperature information associated to the thermal element 92 could have been the rate of temperature increase during the time the heating device 16 is activated. As such, in order to detect the sufficiency of water flow in the heating module on the basis of the thermal element (i.e. step 160), the flow detection device 44 would determine whether the rate of temperature increase of the solid state actuator 93 is above a predetermined rate. In the case where the rate of temperature increase is above a predetermined rate, the flow detection device 44 would determine that there is an insufficient level of water flow within the body 38 of the heating module 14. As shown in FIG. 6a, in the case of line C which represents the temperature of the solid state actuator 93 when there is a sufficient flow of water through the heating module 14, the rate of temperature increase is less than in the case of line D which represents the temperature of the solid state actuator 93 when there is an insufficient level of water flow through the heating module 14.

Alternatively, the temperature information associated to the thermal element 92 could be the specific increase in temperature of the thermal element 92 from the time the heating device 16 is activated to the time the heating device 16 is deactivated. For example, a first temperature of the thermal element 92 can be taken at point G on the graph of FIG. 6*a* prior to the activation of the heating device 16, and then a second temperature can be taken at point H, once the heating device 16 has been deactivated. As such, in order to detect the sufficiency of water flow within the heating module 14, the flow detection device 44 can determine whether the thermal element 92 increased in temperature by a specific amount, such as 1° C., for example, over that time period. In the case where the thermal element 92 did not increase by the specific amount, the flow detection device 44 would determine that there is sufficient flow within the heating module 14. However, in the case where the thermal element 92 increased by more than the specific amount, then the flow detection device 44 would determine that there is insufficient flow within the heating module.

In yet another alternative embodiment, the temperature information associated to the thermal element 92 is the difference between the temperature of the solid state actuator 93 after the heating device 16 has been deactivated (step 126) and the temperature of the water as taken by thermal sensor 35 at the time the heating device 16 is deactivated. In the case where the difference is above a certain predetermined amount, the flow detection device 44 will determine that the solid state actuator 93 has overheated and that there is insufficient water flow within the heating module 14.

In the non-limiting methods described above, the flow detection device 44 does not detect the actual amount of water flowing through the body 38 of the heating module 14. Instead, the flow detection device 44 simply determines whether there is a sufficient level of water flow within the heating module 44, in order to avoid damaging the heating module 14 components. However, in an alternative embodiment, it is possible for the flow detection device 44 to determine the amount of water flowing through the body 38 of the heating module 14. In addition, it is possible that the flow detection device is able to determine more than just whether there is a sufficient level of water flowing through the heating module 14 to avoid damage. For example, in a non-limiting example of implementation, the flow detection device 44 can determine when the amount of water flowing through the heating module has decreased enough such that maintenance is required on the bathing unit system. A method for determining a value of the rate of water flow through the heating module 14, as well as a method for indicating to a user that maintenance is required will be described in more detail with respect to FIG. 7.

Figure 7:
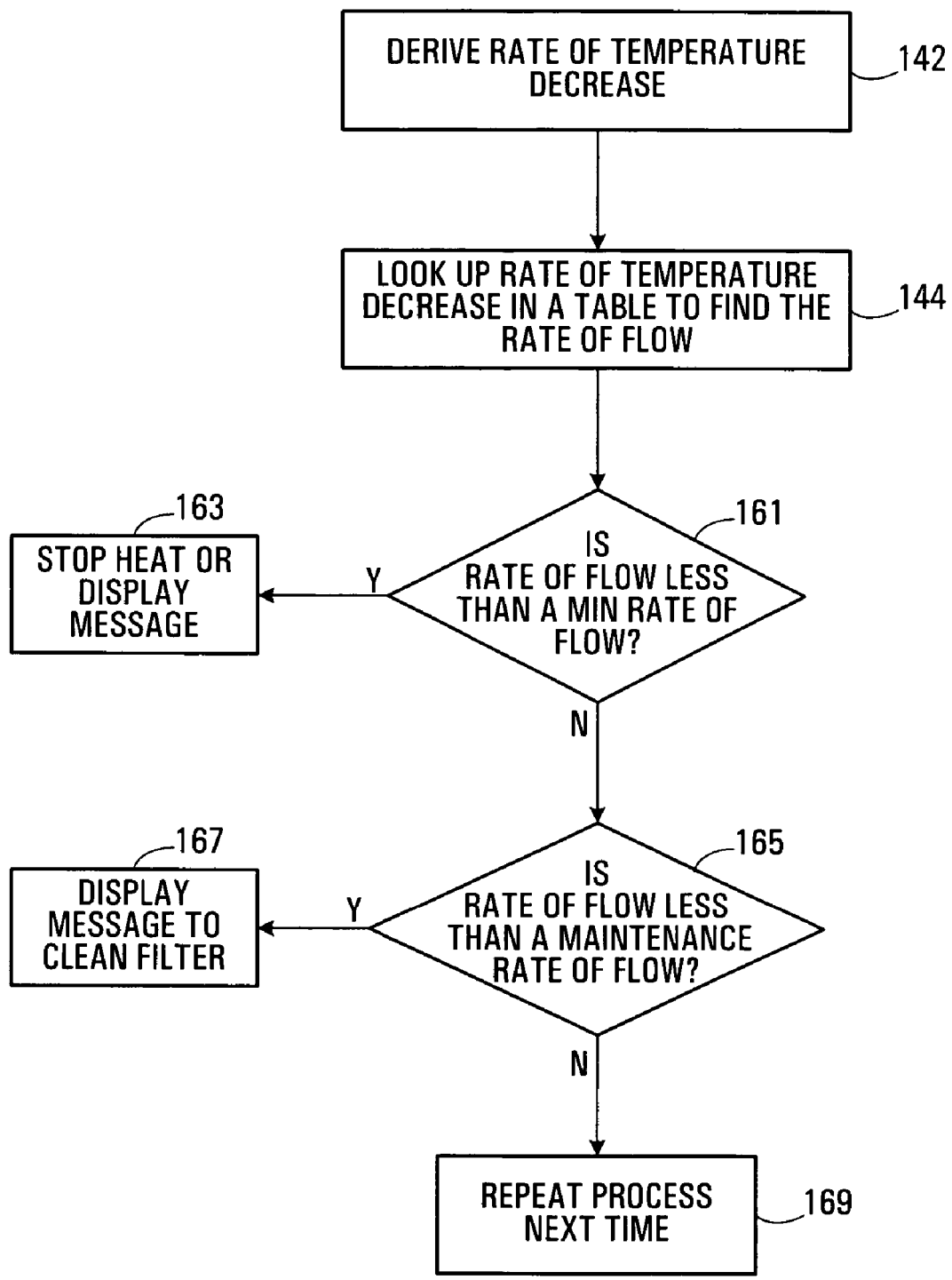
FIG. 7 shows a flow diagram of a method of controlling the heating module in accordance with a non-limiting example of implementation of the present invention.

The method of FIG. 7 continues with the example of implementation described above with respect to FIG. 5. As mentioned above, at step 142 the flow detection device 44 derives the rate of temperature decrease of the solid state actuator 93. Then, at step 144 shown in FIG. 7, the flow detection device 44 compares the rate of temperature decrease derived at step 142 to entries contained in a table stored in the memory of the heating module controller 36. In a non-limiting example of implementation, the table could include numerous entries each including a rate of temperature decrease and a corresponding rate of water flow. Such a table would have to be created from experimental data taken for the specific bathing unit. At step 144, the flow detection device 44 compares the value of the temperature decrease derived at step 142 with the values contained in the table, such that once the flow detection device 44 has matched the derived rate of temperature decrease to an entry in the table, the flow detection device 44 obtains the value of the rate of water flow through the heating module 14 associated to the derived rate of temperature decrease. For the sake of example, let us assume that the rate of water flow through the heating module 14 is 24 GPM.

At step 161, the flow detection device 44 compares that value of the rate of water flow through the heating module 14 to a minimum rate of water flow. If the rate of water flow detected is less than the minimum rate of water flow, the flow detection device 44 proceeds to step 163 wherein it causes the heating device 16 to acquire or remain in the non-heating state, or provides the user with an audio or visual cue, as described above. However, in the case where the rate of water flow detected is greater than the minimum rate of water flow, the flow detection device 44 proceeds to step 165 wherein it compares the rate of water flow through the heating module 14 to a maintenance rate of water flow. The maintenance rate of water flow might be indicative of the rate of water flow necessary for the bathing unit system 10 to function at maximum efficiency. If the rate of water flow detected is less than the maintenance rate of water flow, the flow detection device 44 proceeds to step 167 wherein it issues an audio or visual cue to a user of the bathing unit that it is time to perform maintenance on the bathing unit system, such as cleaning the water filter. In the case where the rate of water flow detected is greater than the maintenance rate of water flow, the flow detection device 44 enables the heating module controller to function as normal until the next time the flow detection device 44 performs the above described method.

It should be understood that steps 161 and above could be performed without detecting the actual value of the rate of water flow through the heating module 14. More specifically, the flow detection device 44 could have detected the whether maintenance needs to be performed on the basis of the rate of temperature decrease, the maximum temperature achieved by the solid state actuator 93, or the rate of temperature increase during the course of heating the solid state actuator 93.

Although the above described process of detecting the sufficiency of water flow through the heating module 14 has been described for a temperature sensing entity 98 comprised of a thermal element 92 and a thermal sensor 97, similar processes to those described in connection with FIGS. 5, 6 and 7 can be applied for embodiments in which the temperature sensing entity 98 is a unitary thermal component. In such embodiments, the flow detection device 44 is adapted to derive temperature information associated to the temperature sensing entity 98 on the basis of the physical characteristics of the unitary thermal component. More specifically, once the temperature sensing entity 98 is activated by enabling current to pass there through, the P-N junction voltage (base-to-emitter voltage in a transistor) is monitored, which allows a measurement of the P-N junction temperature to be obtained. The variation in the P-N junction voltage ($\Delta vbe$ for a transistor) can then be measured to obtain information related to the rate of temperature increase/decrease.

The Embodiments of FIGS. 2B & 2C

In the non-limiting embodiments shown in FIGS. 2B and 2C, the temperature sensing entity 98 is controlled by the flow detection device 44 separately from the heating device 16. As such, in these embodiments, the flow detection device 44 is operative to cause the temperature sensing entity 98 to acquire a temperature condition without having to cause the heating device 16 to acquire a heating state. In a non-limiting example of implementation, the temperature sensing entity 98 could be a heater, or a cooling device, that can be activated in response to a signal from the flow detection device 44. As such, depending on whether the temperature sensing entity 98 is a heating or a cooling device, the actuation of the temperature sensing entity 98 will cause the heating component to either heat up, or cool down.

In the embodiments shown in FIGS. 2B and 2C, the temperature sensing entity 98 is in thermally conductive communication with the water that flows through the heating module 14, via the thermally conductive portion 41 of the body 38. As such, the water flowing through the heating module 14 is operative for affecting the temperature of the temperature sensing entity 98.

It should be understood that the temperature sensing entity 98 can be mounted to the thermally conductive portion 41 of the heating module 14 in any manner known in the art, such as the manner described above.

Figure 8:
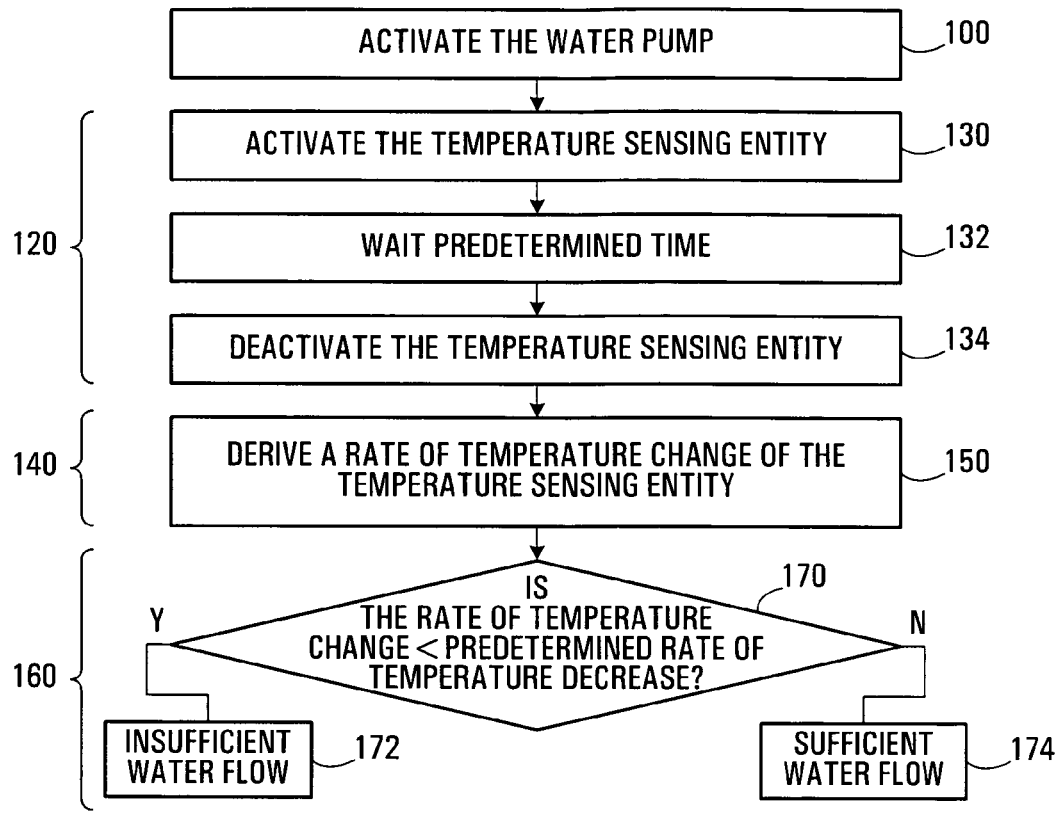
FIG. 8 shows a non-limiting example of a flow diagram of a method for detecting the sufficiency of water flow through a heating module as implemented by the control system of FIG. 2B or FIG. 2C.

Shown in FIG. 8, is a non-limiting example of a method used by the flow detection device 44 for detecting the sufficiency of water within the heating module 14 with the temperature sensing entity 98 shown in FIG. 2B or FIG. 2C.

The first step in the process used by the flow detection device 44 with the temperature sensing entity 98 is the same as the first step in the general flow chart described above with respect to FIG. 4. More specifically, the first step 100 is to activate the water pump 12 in order to initiate the water flowing through the body 38 of the heating module 14.

Once the water pump 12 has been activated, the flow detection device 44 causes the temperature sensing entity 98 to acquire a temperature condition (step 120 as described above with respect to FIG. 3), which could be either an increased temperature, or a decreased temperature.

As such, at step 130, the flow detection device 144 activates the temperature sensing entity 98, such that it begins to heat up or cool down. It will be appreciated that in this embodiment, the flow detection device 44 can activate the temperature sensing entity 98 without having to cause the heating device 16 to acquire the heating state. At step 132, the flow detection device 44 waits a predetermined period of time, such as 3 seconds, and then at step 134, the flow detection device 44 deactivates the temperature sensing entity 98. As such, once these three steps have been completed, the temperature sensing entity 98 is at either an increased temperature, or a decreased temperature, depending on whether it is a heater or a cooling device.

Once the temperature sensing entity 98 has acquired the temperature condition, the flow detection device 44 then obtains temperature information associated to the temperature sensing entity 98 (step 140 as described above with respect to FIG. 3). In the embodiment described herein, the temperature information associated to the temperature sensing entity 98 is a rate of temperature change. As such, at step 150 in the case where the temperature sensing entity 98 has been caused to acquire an increased temperature, the flow detection device 44 derives a rate of temperature decrease. However, in the case where the temperature sensing entity 98 has been caused to acquire a decreased temperature, the flow detection device 44 derives a rate of temperature increase. As will be appreciated by those skilled in the art, once the temperature sensing entity 98 is no longer being heated, cooled or maintained at the certain temperature, but is in thermally conductive communication with the water flowing through the body 38 of the heating module 14, the temperature of the temperature sensing entity 98 will move towards the temperature of the water. As such, in the case where the temperature sensing entity 98 has been caused to acquire a temperature above that of the water, its temperature will begin to decrease, and in the case where the temperature sensing entity 98 has been caused to acquire a temperature below that of the water, its temperature will begin to increase. In addition, the rate of temperature change of the temperature sensing entity 98, either up or down, will be dependent on whether there is a flow of water within the heating module 14. For example, in the case where there is no flow, or very little flow, the rate of temperature change will be less than the rate of temperature change in the case where there is more water flow through the body 38 of the heating module 14.

In the specific embodiment depicted in FIG. 2B, the temperature sensing entity 98 is comprised of a thermal element 92 and a thermal sensor 97. In this embodiment, the rate of temperature change, meaning either the rate of increase or decrease, of the thermal element 92 can be calculated on the basis of temperature readings received from the temperature sensor 97. Alternatively, the rate of temperature change of the thermal element 92 can be received directly from the temperature sensor 97.

In the specific embodiment depicted in FIG. 2C, the temperature sensing entity 98 is comprised of a unitary thermal component. In this embodiment, the flow detection device 44 is adapted to derive temperature information associated to the temperature sensing entity 98 on the basis of the physical characteristics of the unitary thermal component. More specifically, once the temperature sensing entity 98 is activated by enabling current to pass therethrough, the P-N junction voltage (base-to-emitter voltage (vbe) in a transistor) is monitored, which allows a measurement of the P-N junction voltage to be obtained. The variation in the P-N junction voltage ($\Delta vbe$ for a transistor) can then be measured to obtain information related to the rate of temperature increase/decrease.

Once the flow detection device 44 has derived the temperature information associated to the temperature sensing entity 98, which for the purposes of the present example is a rate of temperature change, the flow detection device 44 detects the sufficiency of water flowing through the body 38 on the basis of that temperature information (step 160 as described above with respect to FIG. 3). More specifically, at step 170, the flow detection device 44 determines whether there is sufficiency of water flow within the body 38 of the heating module 14 by determining whether the rate of temperature change detected at step 150 is less than a predetermined rate of temperature change stored in a memory.

In the case where the rate of temperature change of the temperature sensing entity 98 is less than the predetermined rate of temperature decrease, at step 172 the flow detection device 44 determines that there is insufficient water flow within the body 38 of the heating module 14. In the case where the rate of temperature change of the temperature sensing entity 98 is greater than the predetermined rate of temperature change, at step 174, the flow detection device 44 determines that there is a sufficient level of water flow within the body 38 of the heating module 14.

As mentioned above, in the case where the flow detection device 44 detects an insufficiency of water flow, the flow detection device 44 can control the actuator 93 such that the heating device 16 either acquires the non-heating state or remains in the non-heating state, so as not to be able to heat up which could cause damage to one or more of the components within the heating module 14. In this manner, when the flow detection module 44 detects an insufficient level of water flow within the heating module, the flow detection module 44 essentially shuts down the capability of heating the water. Alternatively, the flow detection device 44 issues either an audio or visual cue to the user of the bathing unit system in order to indicate that there may be an insufficient level of water flow within the heating module 14.

In addition, although the temperature information associated to the temperature sensing entity 98 has been described above as being the rate of temperature change, it should be understood that the temperature information could also have been a maximum, or minimum temperature obtained by the temperature sensing entity 98, or alternatively, the temperature information could have been the rate of temperature increase or decrease while the temperature sensing entity 98 was being activated.

Accounting for Water Temperature

The person skilled in the art will appreciate that the rate of temperature increase or decrease of the temperature sensing entity 98 will be affected not only by the flow of water in the heater module but by the actual temperature of the water as well. For example, when the water in the heater module is at a much lower temperature, it will cool the temperature sensing entity 98 at a faster rate than water at a higher temperature and that for a same water flow rate through the heater module.

As a variant, methods taking into account water temperature when comparing the increase/decrease of the temperature sensing entity 98 can be used in specific examples of implementation of the invention.

In a first example taking into account water temperature, and thereby "eliminating" its effect on the determining whether the flow rate is adequate, the flow detection device 44 is provided with a water temperature measurement. The flow detection device 44 includes a memory storing different predetermined rates of temperature change, each rate of temperature change corresponding to a respective water temperature. As such, once the flow detection device 44 has derived the temperature information associated to the temperature sensing entity 98, which for the purposes of the present example is a rate of temperature change, the flow detection device 44 detects the sufficiency of water flowing through the body 38 on the basis of that temperature information and the water temperature information. More specifically, the flow detection device 44 determines whether there is sufficiency of water flow within the body 38 of the heating module 14 by determining whether the rate of temperature change detected at step 150 is less than a predetermined rate of temperature change stored in a memory, the predetermined rate of temperature change being dependent upon the measured water temperature. As such, in the above-described process, the water temperature is taken into account when determining whether the flow rate is sufficient.

In a second example taking into account water temperature, the temperature measurements are "normalized" by a temperature factor. More specifically, the temperature information associated with the temperature sensing entity 98 is sampled at different points in time with reference to an initial temperature and a ratio between initial and final quantities of heat is computed. The ratio is then compared to a predetermined ratio to determine whether the flow of water within the body 38 of the heating module 14 is above a certain threshold. Because of the thermal conduction between the temperature sensing entity 98 and the water, the temperature sensing entity 98 is approximately at the same temperature as water prior to the activation of the temperature sensing entity 98 (at point A 612). By taking temperature measurements by reference to initial temperature (point A 612), water temperature has only a small impact on the calculation. In addition, using a ratio between the initial and final quantities of heat further eliminates variations in the quantity of heat dissipated from practical implementations of the temperature sensing entity 98, due to tolerances in the components.

Figure 6B:
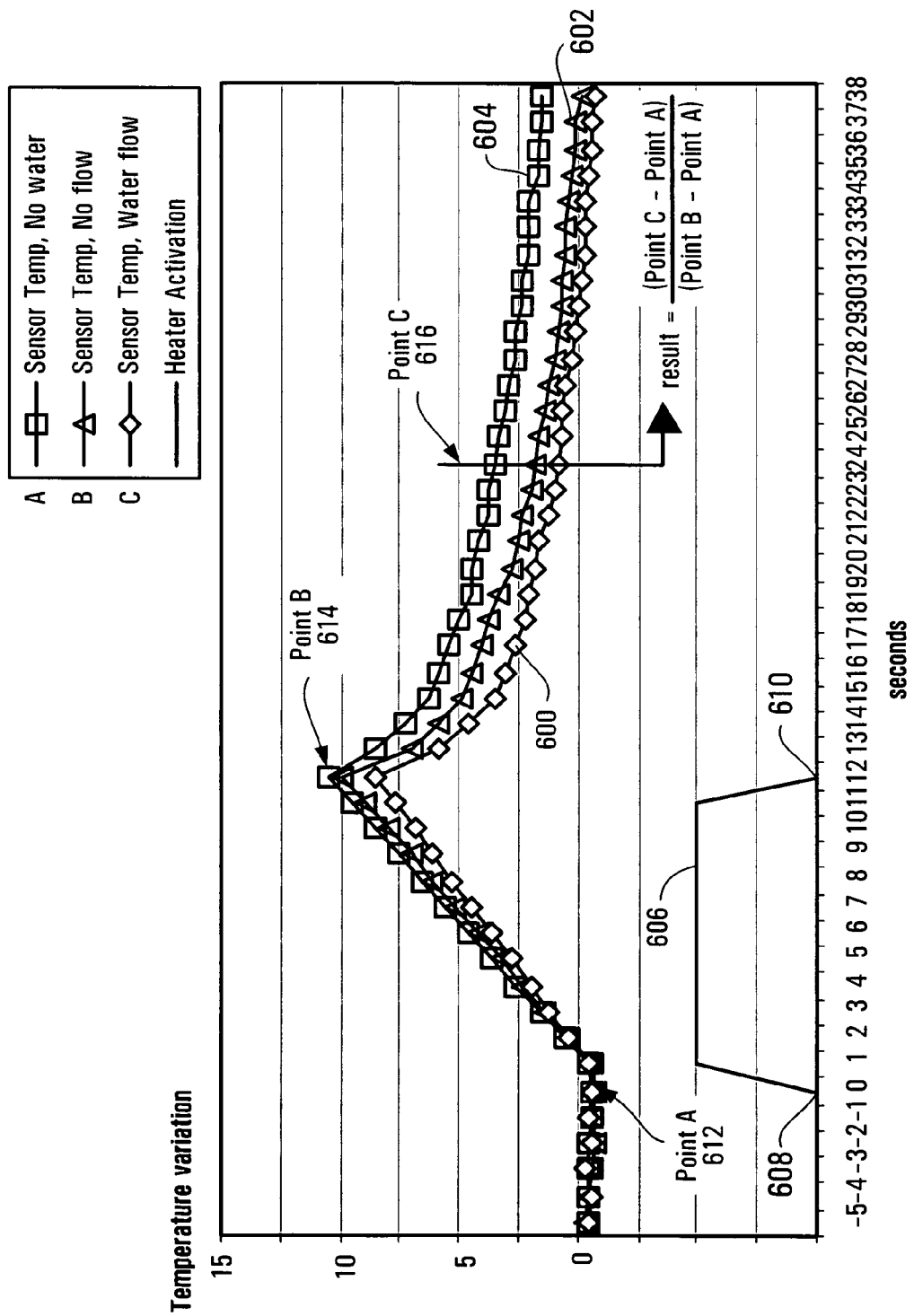
FIG. 6b shows a second graph of the rates of temperature change of a temperature sensing entity in the control system in either one of FIG. 2A, 2B or 2C under three different conditions, namely: a) no water; b) water no flow; c) water with flow.

Shown in FIG. 6b, is a graph of the rates of temperature change of a temperature sensing entity flowing through a heating module under three different conditions, namely: a) no water or insufficient water level; b) water no flow; c) water with flow. More specifically, line 600 in the graph represents the temperature of the temperature sensing entity 98 when there is either no water or an insufficient level of water within the heating module 14. Line 602 in the graph represents the temperature of the temperature sensing entity 98 when there is a sufficient level of water flow within the heating module 14 but an insufficient flow of water within the heating module 14. Line 604 in the graph represents the temperature of the temperature sensing entity 98 when there is a sufficient level of water flow within the heating module 14 and a sufficient flow of water within the heating module 14.

Line 606 represents the activation and deactivation state of the temperature sensing entity 98 over time. As can be observed, the temperature sensing entity 98 is activated between points 608 and 610 and is deactivated otherwise. As such, between points 608 and 610, the temperature of the temperature sensing entity 98 increases as can be observed by lines 600 602 and 604. After point 610 the temperature of the temperature sensing entity 98 decreases.

As such, depending on the rate of temperature decrease of the temperature sensing entity 98 following point 610, the flow detection device 44 is operative to determine whether there is a sufficient level of flow within the heating module 14.

In a specific practical implementation, three temperature measurements associated to the temperature sensing entity 98 are obtained.

More specifically, a first temperature measurement associated with the temperature sensing entity 98 is taken at point A 612. The temperature at point A 612 is measured prior to the activation of the temperature sensing entity 98 and provides a reference point for the future temperature measurements. The temperature sensing entity is then activated for a predetermined time interval between points 608 and 610 and then deactivated. A second temperature measurement associated with the temperature sensing entity 98 is taken at point B 614. Although in the example shown the second temperature measurement is taken soon after the deactivation of the temperature sensing entity 98, the temperature may also be taken immediately prior to the deactivation of the temperature sensing entity 98 without detracting from the spirit of the invention. The temperature measurement taken at point B 614 is taken at or near the highest temperature acquired by the temperature sensing entity 98.

A third temperature measurement associated with the temperature sensing entity 98 is taken at point C 616. The third temperature measurement is taken subsequently to the second temperature measurement at point B 614 and a certain time interval after deactivating the temperature sensing entity 98. The duration of the time interval between the deactivation of the of the temperature sensing entity 98 and the measurement of the temperature of the temperature sensing entity at point C 616 may vary from one implementation to the next. Preferably the time interval is sufficiently long to allow the temperature of the temperature sensing entity 98 to decrease by a few degrees prior to taking the temperature at point C 616.

The flow detection device 44 then processes the first temperature measurement, the second temperature measurement and the third temperature measurement to derive information associated to the sufficiency of water flow through the heating module. In a specific implementation, the flow detection device 44 computing a first difference measurement indicative of a difference between the first temperature measurement (Point A 612) and the second temperature measurement (Point B 614). This difference allows "removing" from the second temperature measurement (Point B 614) the heat contained in the temperature sensing entity 98 prior to the activation of the latter. This also allows removing at least in part the effect of the water temperature on the temperature of the temperature sensing entity 98.

The flow detection device 44 also computes a second difference measurement indicative of a difference between the first temperature measurement (Point A 612) and the third temperature measurement (Point C 616). This difference allows "removing" from the third temperature measurement (Point C 616) the heat contained in the temperature sensing entity 98 prior to the activation of the latter. This also allows removing at least in part the effect of the water temperature on the temperature of the temperature sensing entity 98.

The flow detection device 44 computes a ratio between the first difference measurement and the second difference measurement and derives information associated to the sufficiency of water flow through the heating module at least in part on the basis of that ratio.

Mathematically, the ratio may be expressed as:

$$\frac{\text{Temperature (Point } C) - \text{Temperature (Point } A)}{\text{Temperature (Point } B) - \text{Temperature (Point } A)}$$

Alternatively, it will be readily appreciated that any mathematically equivalent method to compare the ratio to a predefined threshold may be used instead.

The computed ratio is then compared to a threshold ratio to derive the information associated to the sufficiency of water flow through the heating module. The threshold ratio may be established by observing actual known flow rates for various ratios and determining on the basis of best practices and/or safety requirements the threshold ratio corresponding to the minimum required flow rate. For example, if the ratio exceeds the threshold ratio, then an insufficient flow of water in the heating module may be detected.

Although the specific example of implementation described above makes use of three temperature measurements, it will be readily appreciated that additional temperature measurements may be taken without detracting from the spirit of the invention. In addition, fewer measurements may also be taken in certain implementations. For example, in a variant, a first temperature measurement associated with the temperature sensing entity 98 is taken at point A 612. The temperature at point A 612 is measured prior to the activation of the temperature sensing entity 98 and provides a reference point for the future temperature measurements. The temperature sensing entity is then activated for a predetermined time interval between points 608 and 610 and then deactivated. A subsequent temperature measurement associated with the temperature sensing entity 98 is taken at point C 616. The subsequent temperature measurement is taken a certain time interval after deactivating the temperature sensing entity 98. The duration of the time interval between the deactivation of the of the temperature sensing entity 98 and the measurement of the temperature of the temperature sensing entity at point C 616 may vary from one implementation to the next. The flow detection device 44 then computes a difference measurement indicative of a difference between the first temperature measurement (Point A 612) and the subsequent temperature measurement (Point C 616). The computed difference is then compared to a threshold difference to derive the information associated to the sufficiency of water flow through the heating module.

As mentioned above, in the case where the flow detection device 44 detects an insufficiency of water flow, the flow detection device 44 can control the actuator 93 such that the heating device 16 either acquires the non-heating state or remains in the non-heating state, so as not to be able to heat up which could cause damage to one or more of the components within the heating module 14.

Detecting Water Flow on the Basis of Water Temperature Information

In accordance with an alternative embodiment, instead of being able to detect the sufficiency of water flow through the heating module 14 on the basis of temperature information associated to the temperature sensing entity 98, the flow detection device 44 is operative for detecting the sufficiency of water flow through the body of the heating module 14 on the basis of temperature information associated with the water within the heating module.

Figure 9:
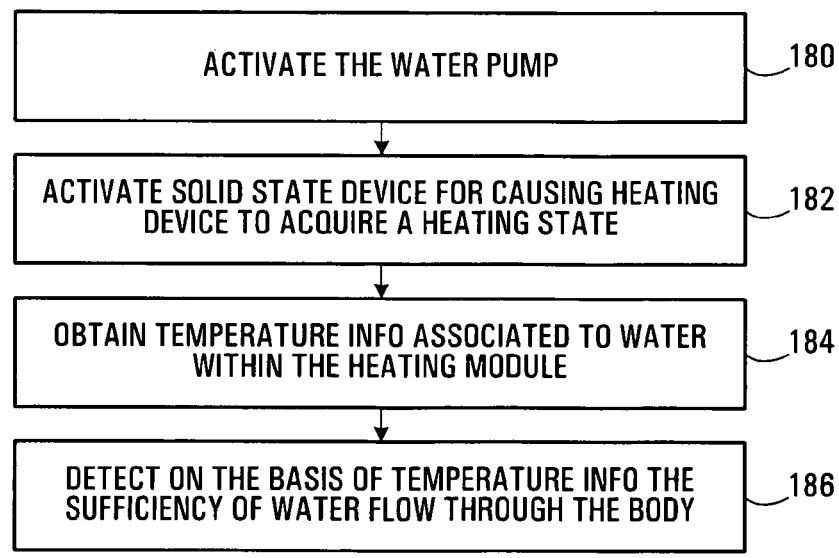
FIG. 9 shows a flow diagram of a method for detecting the sufficiency of water flow through a heating module as implemented by the control system of FIG. 2A, in accordance with an alternative example of implementation of the present invention.

Shown in FIG. 9 is a flow chart depicting a process for detecting the sufficiency of water flow through the body of the heating module 14 on the basis of the water within the heating module 14. This flow chart of FIG. 9 will be explained in more detail with reference to the embodiment shown in FIG. 2A.

The first step 180 of this alternative process is to activate the water pump 12 so as to cause water to flow through the body 38 of the heating module 14. As mentioned above, the water pump 12 can be activated by controlling the relay 95.

At step 182, once the water pump 12 has been activated, the flow detection device 44 causes the thermal element 92, which in the embodiment of FIG. 2A is a solid state device in the form of a Triac, to be activated. By activating the solid state device, current is supplied to the heating device 16, such that the heating device 16 acquires the heating state. The heating device 16 is caused to be activated for a relatively short period of time, such as 3 seconds, which is long enough for the solid state device to heat up, but not long enough to cause any damage to the heating module 14 components if there is no flow of water within the heating module 14.

At step 184, the flow detection device 44 obtains temperature information associated to the water within the heating module 14. In the non-limiting embodiment shown in FIG. 2A, the flow detection device 44 is in communication with the temperature sensor 35 which as mentioned above, is contained in a housing within the body 38 of the heating module 14. As such, the flow detection device 44 is operative for obtaining from the temperature sensor 35 measurements associated with the temperature of the water within the heating module 14.

At step 186, the flow detection device 44 detects the sufficiency of water flow through the body 38 of the heating module 14 at least in part on the basis of the temperature information associated with the water within the heating module 44. As shown in the graph of FIG. 6a, line A represents the temperature of the water within the heating module 44 when there is an insufficient water flow within the heating module 44, and line B represents the temperature of the water within the heating module 44 when there is sufficient water flow within the heating module 44. In the case of line A, the water temperature within the heating module begins to increase, while in the case of line B, the water temperature within the heating module 44 stays quite constant. Based on this graph, it is shown that when there is insufficient water flow within the heating module 14, the water temperature within the heating module 14 increases in response to the activation of the solid state device.

As such, in a first non-limiting example of implementation, the flow detection device 44 determines whether there is a sufficient level of water flow within the heating module 14 by determining whether the rate of temperature increase of the water within the heating module 44 is above a predetermined rate of temperature increase. The predetermined rate of temperature increase can be stored in the memory of the flow detection device 44, or can be entered by a user, or alternatively can be a dynamic value that is dependent on certain environmental factors such as ambient air temperature.

In a non-limiting example of implementation, the flow detection device determines that there is insufficient water flow within the heating module 44 when the rate of temperature increase of the water within the heating module is greater than 0.25° C./2 sec.

It should be understood that the temperature information associated with the water within the heating module could be obtained at any time after the solid state device has caused the heating device 16 to acquire a heating state. For example, the rate of temperature increase of the water within the heating module 44 can be measured while the heating device 16 is activated, such as between points G and H on the graph of FIG. 6a. Alternatively, the rate of temperature increase of the water within the heating module 44 can be measured after the heating device 16 has been both activated, and deactivated, such as during the time period between positions I and J on the graph of FIG. 6a.

It should be understood that the temperature information associated with the water within the heating module 14 that is used by the flow detection device 44 for detecting the sufficiency of flow can be a value other than the rate of temperature increase of the water. For example, the temperature information associated with the water within the heating module 14 could have been a water temperature value at a specific period of time, or could have been a comparison between the water temperature at a first time, and the water temperature at a second time.

Flow Detection Procedure

Figure 10:
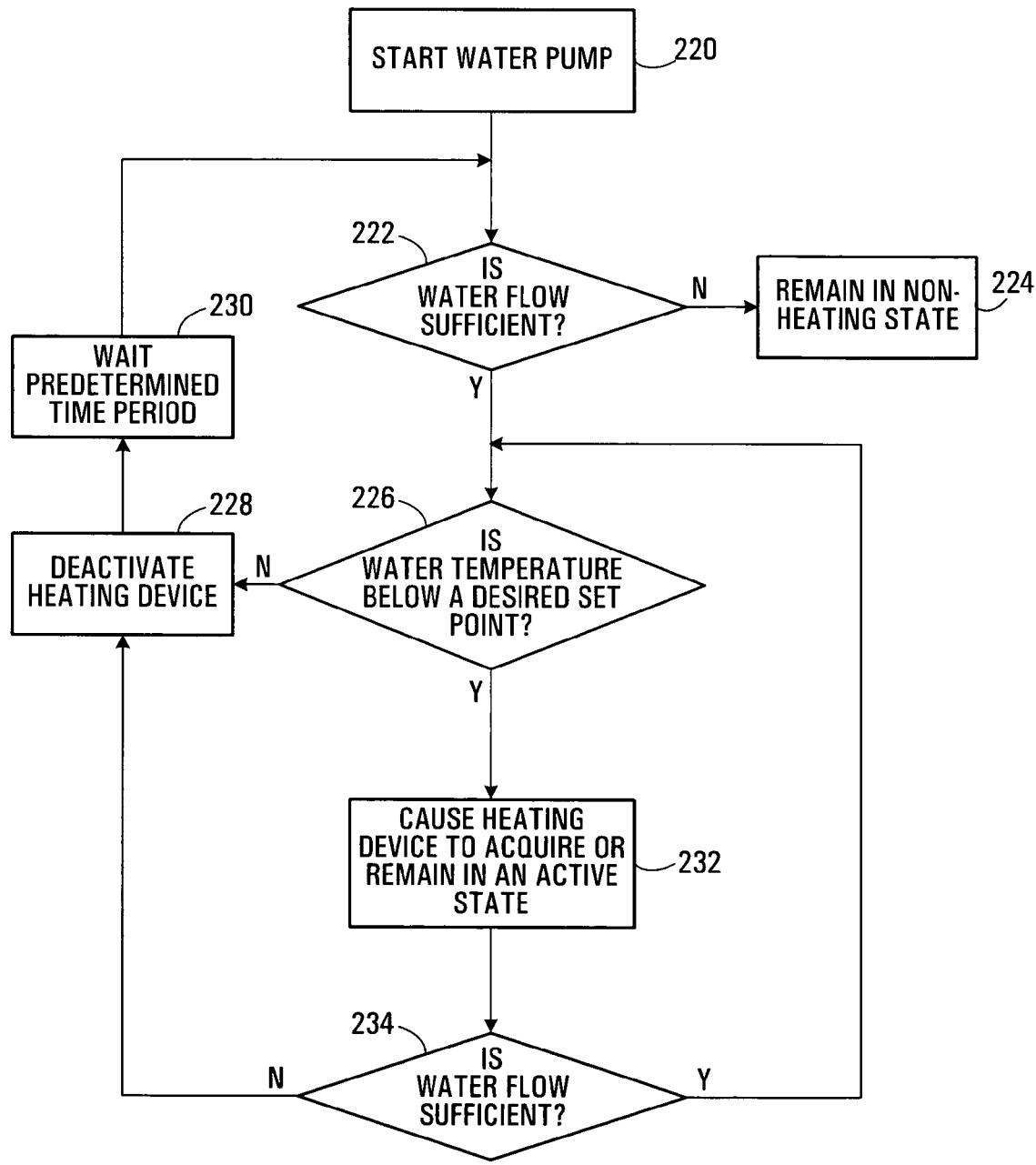
FIG. 10 shows a flow diagram of a procedure for detecting the sufficiency of water flow through a heating module, in accordance with a non-limiting example of implementation of the present invention.

As mentioned above, the flow detection device 44 can be operative for detecting the sufficiency of water flow within the heating module 14 upon start-up of the bathing unit system (i.e. prior to the heating device 16 being activated for heating up the water), and/or at predetermined time intervals during the course of operation of the bathing unit system. Shown in FIG. 10, is a flow diagram depicting a non-limiting process used by the control system 33 for detecting the sufficiency of water flow within the heating module prior to each activation of the heating device 16, as well as during the activation of the heating device 16. As such, this process adds additional security to the bathing unit system 10.

Upon start up of the bathing unit system 10, the first step 220 is to cause the water pump 12 to be activated so as to initiate the water flowing through the body 38 of the heating module 14. In a non-limiting embodiment, the water pump 12 can be activated for approximately 1 minute prior to commencing the next step in the procedure. This ensures that the water in the water receptacle 18, the circulation piping, and the heating module 14 have a chance to circulate.

At step 222, the flow detection device 44 detects whether the water flow within the heating module 14 is sufficient. This can be done using any one of the methods described above with respect to the embodiments shown in FIGS. 2A 2B and 2C. In this manner, the sufficiency of water flow within the heating module 14 is detected prior to the control system 33 trying to heat the water within the heating module 14.

In the case where the flow detection device 44 detects that there is insufficient water flow within the heating module 14, the control system 33 proceeds to step 224 wherein the heating device 16 is caused to remain in the non-heating state. In this manner, when an insufficiency of water flow is detected, the control system 33 prevents the heating device 16 from acquiring the heating state for heating the water within the heating module 14.

This ensures that the components of the heating module 14 are not damaged by too much heat produced by the heating device 16.

However, in the case where at step 222 the flow detection device 44 detects that there is sufficient water flow within the heating module 14, the control system 33 proceeds to step 226, wherein the temperature regulation device 40 determines whether the temperature of the water within the heating module is below a desired set point. In the case where the bathing unit system 10 is starting up, there is a good chance that the water in the heating module 14 will be below the desired set point. In this case, the control system 33 will proceed to step 232 wherein the temperature regulation device 232 causes the heating device 16 to acquire the heating state. As such, it is not until this step that the heating device 16 is activated for causing the water in the heating module 14, and thus the circulation piping and the water receptacle 18 to be heated up.

Once the heating device 16 has been activated such that it acquires the heating state, at step 234, the flow detection device 44 continues to monitor the sufficiency of the water flow within the heating module 14. This can be done in a variety of different ways. For example, in one non-limiting example of implementation, the flow detection device 44 can receive measurements from both the temperature sensing entity 98 and the temperature sensor 35 for comparing the difference between the temperature of the temperature sensing entity 98 and the temperature of the water within the heating module 14. In the case where difference is above a certain threshold, the flow detection device will determine that there is insufficient flow within the heating module 14. In a specific non-limiting example of implementation, the threshold value could be 85° F.

In an alternative example of implementation, the flow detection device 44 can receive measurements from the temperature sensor 35 for determining whether the rate of temperature increase of water within the heating module 14 is above a certain predetermined rate of temperature increase. In the case where the rate of temperature increase of the water within the heating module 14 is above the certain predetermined rate of temperature increase, then the flow detection device 44 determines that there is an insufficient flow of water within the heating module 14. It should be understood that this method of detecting the sufficiency of water flow could be performed in combination with other methods.

In the case where the flow detection device 44 detects at step 234 that there is an insufficient level of water flow within the heating module, it proceeds to step 228, wherein the heating device 16 is deactivated, so as to acquire the non-heating state. In this manner, as soon as the flow detection device 44 detects an insufficiency of water flow, the heating device 16 is quickly deactivated in order to prevent serious damage to the components of the heating module 14.

In the case where the flow detection device 44 detects at step 234 that there is a sufficient level of water flow within the heating module, it then loops back to step 226 wherein the temperature regulation device 40 determines whether the temperature of the water within the heating module 14 is below the desired set point. In the case where the water temperature is still below the desired set point, steps 232 and 234 are repeated.

However, in the case where the temperature regulation device 40 determines that the temperature of the water within the heating module 14 is above the desired set point, then the control system 33 proceeds to step 228, wherein the heating device 16 is deactivated, so that it acquires the non-heating state. In this manner, the water in the heating module 14, as well as the water receptacle 18 is given an opportunity to cool down. Once the heating device 16 has been deactivated, the control system 33 proceeds to step 230 wherein it waits a predetermined period of time, prior to proceeding back to step 222, wherein the flow detection device 44 determines whether there is still sufficient flow of water within the heating module 14 prior to determining whether the water temperature has fallen below the desired set point such that the heating device 16 needs to be reactivated.

In an alternative embodiment, at step 228 both the heating device 16 and the water pump 12 are deactivated. If that is the case, after step 230, the procedure returns to step 220 instead of step 222.

Physical Implementation

Those skilled in the art should appreciate that in some embodiments of the invention, all or part of the functionality associated with the heating module controller 36, such as the temperature regulation device 40, the high limit device 42 and the flow detection device 44, may be implemented as pre-programmed hardware or firmware elements (e.g., application specific integrated circuits (ASICs), electrically erasable programmable read-only memories (EEPROMs), etc.) or other related components.

In other embodiments of the invention, all or part of the functionality previously described herein with respect to the heating module controller 36 may be implemented as software consisting of a series of instructions for execution by a computing unit. The series of instructions could be stored on a medium which is fixed, tangible and readable directly by a computing unit (e.g., removable diskette, CD-ROM, ROM, PROM, EEPROM or fixed disk) or the instructions could be stored remotely but transmittable to the computing unit via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Figure 11:
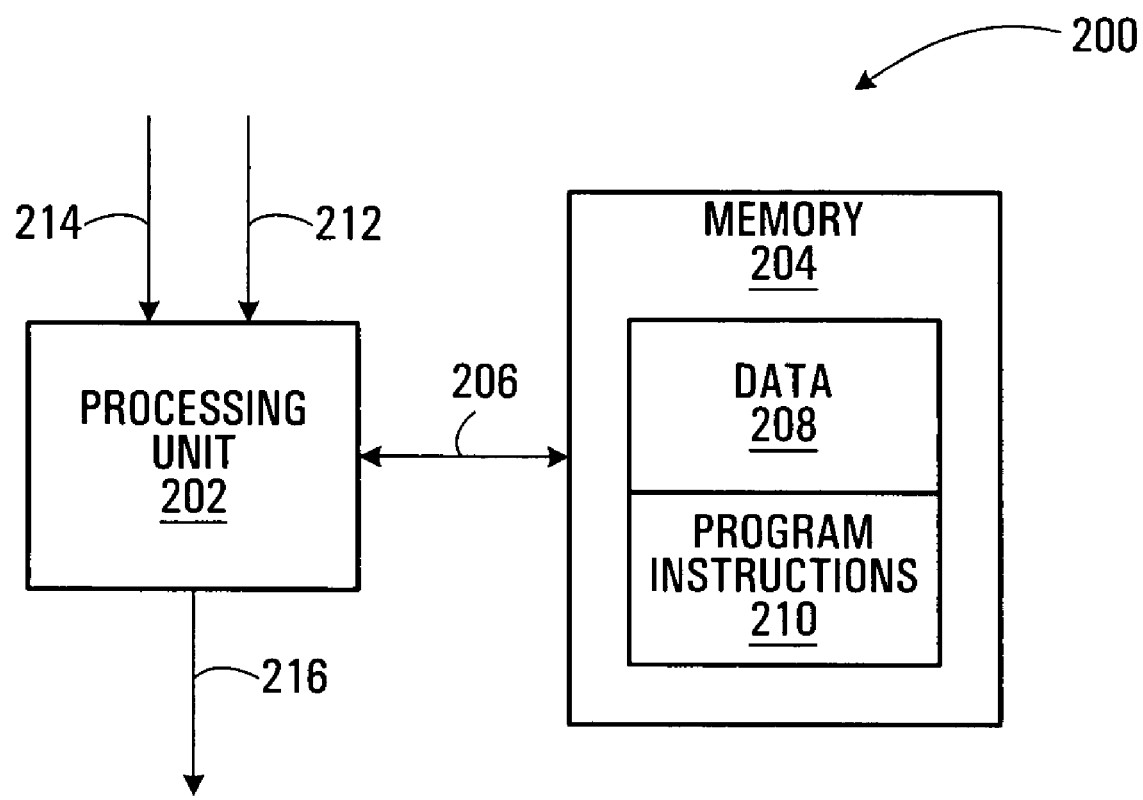
FIG. 11 shows a computing unit for implementing a flow detection device, in accordance with a non-limiting example of implementation of the present invention.

The heating module controller 36 may also be configured as a computing unit 200 of the type depicted in FIG. 11, including a processing unit 202 and a memory 204 connected by a communication bus 206. The memory 204 includes data 208 and program instructions 210. The processing unit 202 is adapted to process the data 208 and the program instructions 210 in order to implement the process described in the specification and depicted in the drawings. The computing unit 202 may also comprise a number of interfaces 212, 214 and 216 for receiving or sending data elements to external devices. For example, interfaces 212, 214 might receive signals from the temperature sensors 35, 37, 97 and 98 and the water level sensor 34 as described above, and as such are used for receiving data streams. The processing unit 202 is operative for processing the received signal or signals to derive a control signal for controlling the plurality of actuators 91 and 93. Interface 216 is for releasing the control signals.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for measuring a sufficiency of water flow through a heating module of a bathing unit, the heating module having a body defining a passage through which water can flow and a heating device for heating the water that flows through the body, the heating device being adapted for acquiring a heating state and a non-hearing state, the method comprising:
    a) obtaining a first temperature measurement associated with a thermal element mounted in thermally conductive communication with water flowing through the body of said heating module, the first temperature measurement being distinct from a water temperature associated to the water that flows through the body of the heating module;
    b) activating the thermal element to cause it to acquire a certain temperature condition for a predetermined time interval;
    c) deactivating the thermal element following the predetermined time interval;
    d) obtaining a subsequent temperature measurement associated with the thermal element, the subsequent temperature measurement:
        i) being taken a certain time interval after deactivating the thermal element; and
        ii) being distinct from a water temperature associated to the water that flows through the body of the heating module:
    e) processing the first temperature measurement and the subsequent temperature measurement to derive information associated to the sufficiency of water flow through the heating module;
    f) causing the device to acquire a selected one of the heating state and the non-heating state based at least in part on the information associated to the sufficiency of water flow derived in step e).

2. A method as defined in claim 1, wherein said method comprises:
    a) computing a difference measurement indicative of a difference between the first temperature measurement and the subsequent temperature measurement;
    b) deriving the information associated to the sufficiency of water flow through the heating module based at least in part on the difference measurement.

3. A method as defined in claim 1, wherein said subsequent temperature measurement is a third temperature measurement, said method comprising:
    a) obtaining a second temperature measurement associated with the thermal element, the second temperature measurement being taken after deactivating the thermal element and prior to taking the third temperature measurement;
    b) processing the first temperature measurement, the second temperature measurement and the third temperature measurement to derive information associated to the sufficiency of water flow through the heating module.

4. A method as defined in claim 3, wherein said method comprises:
    a) computing a first difference measurement indicative of a difference between the first temperature measurement and the second temperature measurement;
    b) computing a second difference measurement indicative of a difference between the first temperature measurement and the third temperature measurement;
    c) deriving the information associated to the sufficiency of water flow through the heating module based at least in part on a ratio between the first difference measurement and the second difference measurement.

5. A method as defined in claim 4, wherein said method comprises:
   a) computing a ratio between the first difference measurement and the second difference measurement;
   b) comparing the ratio between the first difference measurement and the second difference measurement to a threshold ratio to derive the information associated to the sufficiency of water flow through the heating module.

6. A method as defined in claim 1, wherein the thermal element is activated and deactivated independently from the activation and deactivation of the heating device.

7. A method as defined in claim 1, wherein the thermal element is activated when the heating device acquires the heating state and is deactivated when the heating device acquires the non-heating state.

8. A method as defined in claim 1, wherein steps a), b), c), d) and e) are performed while the heating device is in the non-heating state.

9. A method as defined in claim 1, wherein said thermal element includes a transistor, the transistor including a base and an emitter, wherein obtaining a first temperature measurement associated with the thermal element includes:
   a) obtaining a first voltage measurement between the base and emitter of the transistor;
   b) processing the voltage measurement to derive the first temperature measurement.

10. A method as defined in claim 1, wherein said method comprises causing the heating device to acquire the non-heating state upon detection of insufficient water flow.

11. A method as defined in claim 1, wherein said method comprises conveying to a user data derived at least in part from the information associated to the sufficiency of water flow through the heating module.

12. A method as defined in claim 11, wherein said method comprises causing a display unit to display a message conveying the data derived at least in part from the information associated to the sufficiency of water flow through the heating module.

13. A control system for regulating water temperature a bathing unit, the bathing unit including a receptacle for holding water, said control system comprising:
   a) a heating module including:
      i) a body defining a passage through which water can flow;
      ii) a heating device operative for heating the water that flows through said body, the heating device being adapted for acquiring a heating state and a non-heating state;
   b) a thermal element mounted in thermally conductive communication with water flowing through the body of said heating module;
   c) a heating module controller for controlling activation of the heating device, said heating module controller being operative for performing a water flow sufficiency detection process comprising:
      i) obtaining a first temperature measurement associated with the thermal element, the first temperature measurement being distinct from a water temperature associated to the water that flows through the body of the heating module;
      ii) activating the thermal element to cause it to acquire a certain temperature condition for a predetermined time interval;
      iii) deactivating the thermal element following the predetermined time interval;
      iv) obtaining a subsequent temperature measurement associated with the thermal element, the subsequent temperature measurement:
         1. being taken a certain time interval after deactivating the thermal element; and
         2. being distinct from a water temperature associated to the water that flows through the body of the heating module;
      v) processing the first temperature measurement and the subsequent temperature measurement to derive information associated to a sufficiency of water flow through the heating module;
      vi) causing the heating device to acquire a selected one of the heating state and the non-heating state based at least in part on the information associated to the sufficiency of water flow derived in step v).

14. A control system as defined in claim 13, wherein said heating module controller is operative for:
   a) computing a difference measurement indicative of a difference between the first temperature measurement and the subsequent temperature measurement;
   b) deriving the information associated to the sufficiency of water flow through the heating module based at least in part on the difference measurement.

15. A control system as defined in claim 13, wherein said subsequent temperature measurement is a third temperature measurement, said heating module controller being operative for:
   a) obtaining a second temperature measurement associated with the thermal element, the second temperature measurement being taken after deactivating the thermal element and prior to taking the third temperature measurement;
   b) processing the first temperature measurement, the second temperature measurement and the third temperature measurement to derive information associated to the sufficiency of water flow through the heating module.

16. A control system as defined in claim 13, wherein the body of said heating module has a thermally conductive portion that extends from an inner surface of the body of said heating module to an outer surface of the body of said heating module, said thermal element being mounted in contact with said thermally conductive portion.

17. A control system as defined in claim 13, wherein said heating module controller is operative for preventing said heating device from acquiring the heating state upon detection of insufficient water flow through said body.

18. A control system as defined in claim 13, further comprising a user interface for conveying to a user data derived at least in part from the information associated to the sufficiency of water flow through the heating module.

19. A control system as defined in claim 18, wherein said user interface includes a display unit, said heating module controller being operative for causing said display unit to display a message conveying data derived at least in part from the information associated to the sufficiency of water flow through the heating module.

20. A control system as defined in claim 13, wherein said thermal element is operative for controlling power supplied to said heating device, said thermal element increasing in temperature as it supplies power to said heating device.

21. A control system as defined in claim 13, wherein said thermal element includes a device selected from the set consisting of TRIACs, SRCs, FETs, IGBTs, MOSFETs, JFETs and BJTs (bipolar junction transistors).

22. A control system as defined in claim 13, wherein said thermal element includes a transistor, the transistor including a base and an emitter, wherein said heating module controller is adapted for obtaining a first temperature measurement associated with the thermal element by:
    a) obtaining a first voltage measurement between the base and emitter of the transistor;
    b) processing the voltage measurement to derive the first temperature measurement.

23. A control system as defined in claim 13, wherein said heating module controller is adapted to activate the thermal element while the heating device is deactivated.

24. A control system as defined in claim 13, wherein said heating module controller is adapted to activate the thermal element independently from the activation of the device.

25. A control system as defined in claim 13, wherein the thermal element is connected in series with the heating device so that the thermal element is activated when the heating device acquires the heating state and is deactivated when the heating device acquires the non-heating state.

26. A control system as defined in claim 15, wherein said heating module controller is adapted for:
    a) computing a first difference measurement indicative of a difference between the first temperature measurement and the second temperature measurement;
    b) computing a second difference measurement indicative of a difference between the first temperature measurement and the third temperature measurement;
    c) deriving the information associated to the sufficiency of water flow through the heating module based at least in part on a ratio between the first difference measurement and the second difference measurement.

27. A control system as defined in claim 26, wherein said heating module controller is adapted for:
    a) computing a ratio between the first difference measurement and the second difference measurement;
    b) comparing the ratio computed in a) to a threshold ratio to derive the information associated to the sufficiency of water flow through the heating module.

28. A control system for a bathing unit, said control system comprising:
    a) a heating module including:
        i) a body defining a passage through which water can flow;
        ii) a heating device operative for heating the water that flows through said body, the heating device being adapted for acquiring a heating state and a non-heating state;
    b) a temperature sensing entity mounted in thermally conductive communication with water flowing through said body, said temperature sensing entity including a unitary thermal component:
        ii) providing information associated to a measure of temperature of said temperature sensing entity, said measure of temperature being distinct from water temperature information associated to the water that flows through the body of said heating module;
    c) a heating module controller operative for:
        i) activating and deactivating said temperature sensing entity to obtain temperature information associated with said temperature sensing entity;
        ii) processing the temperature information associated with said temperature sensing entity to derive information associated to a sufficiency of water flow through the body of said heating module;
        iii) causing the heating device to acquire a selected one of the heating state and the non-heating state based at least in part on the information associated to the sufficiency of water flow derived in ii).

29. A control system as defined in claim 28, wherein said heating module controller is operative for:
    a) obtaining a first temperature measurement associated with the temperature sensing entity;
    b) activating the temperature sensing entity to cause it to acquire a certain temperature condition for a predetermined time interval;
    c) deactivating the temperature sensing entity following the predetermined time interval;
    d) obtaining a subsequent measurement value associated with the temperature sensing entity, the subsequent temperature measurement:
        i) being taken a certain time interval after deactivating the temperature sensing entity; and
        ii) being distinct from a water temperature associated to the water that flows through the body of the heating module;
    e) processing the first temperature measurement and the subsequent temperature measurement to derive information associated to a sufficiency of water flow through the heating module.

30. A control system as defined in claim 29, wherein said heating module controller being operative for:
    a) computing a difference measurement indicative of a difference between the first temperature measurement and the subsequent temperature measurement;
    b) deriving the information associated to the sufficiency of water flow through the heating module based at least in part on the difference measurement.

31. A control system as defined in claim 29, wherein said subsequent temperature measurement is a third temperature measurement, said heating module controller being operative for:
    a) obtaining a second temperature measurement associated with the temperature sensing entity, the second temperature measurement being taken after deactivating the temperature sensing entity and prior to taking the third temperature measurement;
    b) processing the first temperature measurement, the second temperature measurement and the third temperature measurement to derive information associated to the sufficiency of water flow through the heating module.

32. A control system as defined in claim 31, wherein said heating module controller is adapted for:
    a) computing a first difference measurement indicative of a difference between the first temperature measurement and the second temperature measurement;
    b) computing a second difference measurement indicative of a difference between the first temperature measurement and the third temperature measurement;
    c) deriving the information associated to the sufficiency of water flow through the heating module based at least in part on a ratio between the first difference measurement and the second difference measurement.

33. A control system as defined in claim 32, wherein said heating module controller is adapted for:
    a) computing a ratio between the first difference measurement and the second difference measurement;
    b) comparing the ratio computed in a) to a threshold ratio to derive the information associated to the sufficiency of water flow through the heating module.

34. A control system as defined in claim 28, wherein said heating module controller is operative for preventing said heating device from heating the water in the body of said heating module upon detection of insufficient water flow through said body.

35. A control system as defined in claim 28, wherein said temperature sensing entity includes a device selected from the set consisting of TRIACs, SRCs, FETs, IGBTs, MOSFETs, JFETs and BJTs (bipolar junction transistors).

36. A control system as defined in claim 28, wherein said temperature sensing entity includes a transistor, the transistor including a base and an emitter, wherein said heating module controller is adapted for obtaining a first temperature measurement associated with the temperature sensing entity by:
  a) obtaining a first voltage measurement between the base and emitter of the transistor;
  b) processing the voltage measurement to derive the first temperature measurement.

37. A control system as defined in claim 28, wherein said control system comprises a display unit to display a message conveying the data derived at least in part from the information associated to the sufficiency of water flow through the heating module.

38. A control system for a bathing unit, said control system comprising:
  a) heating means including a body defining a passage through which water can flow, said heating means being operative for heating the water that flows through said body, said heating means being adapted for acquiring a heating state and a non-heating state;
  b) a temperature sensing entity mounted in thermally conductive communication with water flowing through said body, said temperature sensing entity including a unitary thermal component:
    ii) providing information associated to a measure of temperature of said temperature sensing entity;
  c) means for activating and deactivating said temperature sensing entity to obtain temperature information associated with said temperature sensing entity, said temperature information being distinct from water temperature information associated to the water that flows through the body of said heating module;
  d) means for processing the temperature information associated with said temperature sensing entity to derive information associated to a sufficiency of water flow through the body of said heating means;
  e) means for causing the heating device to acquire a selected one of the heating state and the non-heating state based at least in part on the information associated to the sufficiency of water flow derived in d).

39. A computer readable storage medium including a program element suitable for execution by a computing apparatus for measuring a sufficiency of water flow through a heating module for a bathing unit, the heating module having a body defining a passage through which water can flow and a heating device for heating the water that flows through the body, the heating device being adapted for acquiring a heating state and a non-heating state, said computing apparatus comprising:
  a) a memory unit;
  b) a processor operatively connected to said memory unit, said program element when executing on said processor being operative for:
    i) obtaining a first temperature measurement associated with a thermal element mounted in thermally conductive communication with water flowing through the body of said heating module, the first temperature measurement being distinct from a water temperature associated to the water that flows through the body of the heating module;
    ii) activating the thermal element to cause it to acquire a certain temperature condition for a predetermined time interval;
    iii) deactivating the thermal element following the predetermined tune interval;
    iv) obtaining a subsequent temperature measurement associated with the thermal element, the subsequent temperature measurement:
      1. being taken a certain time interval after deactivating the thermal element; and
      2. being distinct from a water temperature associated to the water that flows through the body of the heating module;
    v) processing the first temperature measurement and the subsequent temperature measurement to derive information associated to a sufficiency of water flow through the heating module;
    vi) causing the heating device to acquire a selected one of the heating state and the non-heating state based at least in part on the information associated to the sufficiency of water flow derived in step v).

40. A control system for a bathing unit, said control system comprising:
  a) heating means including a body defining a passage through which water can flow, said heating means being operative for heating the water that flows through said body;
  b) thermal means in thermally conductive communication with water flowing through said body;
  c) controller means operative for:
    i) obtaining temperature information associated with said thermal means for detecting at least in part on a basis of said temperature information the sufficiency of water flow through said body, said temperature information associated with said thermal means being distinct from water temperature associated to water flowing through the body of said heating means;
    ii) causing said heating means to acquire a selected one of a heating state and a non-heating state based at least in part on the temperature information associated with said thermal means.

* * * * *

UNITED STATES PATENT AND TRADEMARK OFFICE
CERTIFICATE OF CORRECTION

PATENT NO.         : 7,593,789 B2
APPLICATION NO. : 11/389185
DATED                 : September 22, 2009
INVENTOR(S)        : Florent Gougerot et al.

Page 1 of 1

It is certified that error appears in the above-identified patent and that said Letters Patent is hereby corrected as shown below:

Col. 32 line 32: Add the word "heating" between "the" and "device";

Col. 33 line 41: Add the article "of" before the expression "a bathing unit";

Col. 35 line 51: Remove "ii";

Col. 37 line 30: Remove "ii";

Col. 38 line 16: Replace the word "tune" by the word "time".

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,593,789 B2  Page 1 of 1
APPLICATION NO. : 11/389185
DATED : September 22, 2009
INVENTOR(S) : Gougerot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this

Twenty-eighth Day of September, 2010

David J. Kappos
*Director of the United States Patent and Trademark Office*